United States Patent
Furuya et al.

(10) Patent No.: US 8,547,621 B2
(45) Date of Patent: Oct. 1, 2013

(54) LASER LIGHT SOURCE, WAVELENGTH CONVERSION LASER LIGHT SOURCE AND IMAGE DISPLAY DEVICE

(75) Inventors: Hiroyuki Furuya, Fukuoka (JP); Nobuyuki Horikawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 23 days.

(21) Appl. No.: 13/256,009

(22) PCT Filed: Jan. 11, 2011

(86) PCT No.: PCT/JP2011/000064
§ 371 (c)(1),
(2), (4) Date: Sep. 12, 2011

(87) PCT Pub. No.: WO2011/086885
PCT Pub. Date: Jul. 21, 2011

(65) Prior Publication Data
US 2012/0002263 A1    Jan. 5, 2012

(30) Foreign Application Priority Data

Jan. 12, 2010 (JP) ................................. 2010-003740

(51) Int. Cl.
*G02F 1/01* (2006.01)
*H01F 3/08* (2006.01)
(52) U.S. Cl.
USPC .............................. 359/238; 250/225; 372/92
(58) Field of Classification Search
USPC ............. 359/238, 237, 245, 248, 254; 372/6, 372/22, 34, 39, 92; 250/205
See application file for complete search history.

(56) References Cited

U.S. PATENT DOCUMENTS

| | | | |
|---|---|---|---|
| 4,656,635 A | 4/1987 | Baer et al. | |
| 6,134,251 A | 10/2000 | Kawase et al. | |
| 7,082,150 B2* | 7/2006 | Momiuchi | 372/75 |
| 7,254,148 B2* | 8/2007 | Masuda | 372/29.02 |
| 7,593,443 B2* | 9/2009 | Tojo | 372/49.01 |

FOREIGN PATENT DOCUMENTS

| | | |
|---|---|---|
| JP | 62-189783 | 8/1987 |
| JP | 2-202079 | 8/1990 |
| JP | 11-54838 | 2/1999 |
| JP | 11-330630 | 11/1999 |
| JP | 2002-57388 | 2/2002 |
| JP | 2007-299962 | 11/2007 |

OTHER PUBLICATIONS

International Search Report issued Apr. 5, 2011 in International (PCT) Application No. PCT/JP2011/000064.
Jianren Lu et al., "Highly efficient 2% Nd:yttrium aluminum garnet ceramic laser", Applied Physics Letters, vol. 77, No. 23, Dec. 4, 2000, pp. 3707-3709.

(Continued)

*Primary Examiner* — Tuyen Tra
(74) *Attorney, Agent, or Firm* — Wenderoth, Lind & Ponack, L.L.P.

(57) ABSTRACT

A laser light source having a semiconductor laser light source which emits a laser beam, a laser medium excited by the semiconductor laser light source to emit light, two reflectors configured to work as a resonator to confine the light emitted by the laser medium, and a holder which holds the laser medium, wherein stress is generated in the laser medium formed of a ceramic material situated in the resonator so as to control a polarization direction of the light emitted by the laser medium.

12 Claims, 27 Drawing Sheets

(56) References Cited

OTHER PUBLICATIONS

Jianren Lu et al., "Highly Efficient Nd:$Y_3Al_5O_{12}$ Ceramic Laser", Japanese Journal of Applied Physics, vol. 40 (2001), pp. L552-L554.

Zhang Chunping et al., "Effects of stress mirror cavity on polarization characteristics of lasers," Chinese Journal of Lasers, 1974, vol. 12, No. 2, Department of Physics, Nankai University, 1974. (English language abstract provided).

* cited by examiner

LASER LIGHT SOURCE, WAVELENGTH CONVERSION LASER LIGHT SOURCE AND IMAGE DISPLAY DEVICE

TECHNICAL FIELD

The present invention is related to a laser light source using a ceramic material as a laser medium.

BACKGROUND ART

Fiber lasers using quartz fibers, to which rare earth ions are added as the laser medium, and ceramic lasers using polycrystalline ceramic materials, to which rare earth ions are similarly added as the laser medium, have been developed as light sources for laser processes or medical use. In particular, a high concentration of the rare earth ions may be added to the polycrystalline ceramic materials. Accordingly, if a laser medium is excited by means of light, it may require a shorter length to absorb the excitation light. The aforementioned advantageous characteristics make the polycrystalline ceramic materials more attractive as materials used for a compact laser device, which provides very efficient quality beam.

Laser light sources using the aforementioned ceramic material are examined by numerous organizations.

FIG. 28 is a schematic view of an infrared laser light source disclosed in Patent Document 1 or a short pulse laser light source disclosed in Non-Patent Document 1 or 2. FIG. 29 is a schematic view of a disc laser light source disclosed in Patent Document 2. The conventional laser light sources shown in FIGS. 28 and 29 are described hereinafter.

In addition to researches about laser mediums using polycrystalline ceramic materials, researches for polarization control of a semiconductor laser have also been conducted. For example, a polarization control method of a semiconductor laser using a thin film structure on a semiconductor substrate has been publicly disclosed.

Since the ceramic laser medium is an isotropic medium, the polarization of the generated light becomes randomly directed. If the output light has to be a single polarization, half of the output becomes loss. Since the ceramic laser medium does not have an epitaxial growth structure of a thin film semiconductor material like a semiconductor laser element, polarization control is not effective if the polarization control depends only on formation of the thin film structure.

Insertion of a single polarizing element into a laser resonator is exemplified as a conventional polarization control to the ceramic laser medium. The insertion of the single polarizing element, however, results in enlargement of the laser system. In addition, the insertion of the single polarizing element means addition of a new component, which increases manufacturing cost of the laser system.

Patent Document 1: Japanese Patent Application Laid-open No. 2002-57388
Patent Document 2: Japanese Patent Application Laid-open No. 2007-299962
Patent Document 3: Japanese Patent Application Laid-open No. H11-54838
Patent Document 4: Japanese Patent Application Laid-open No. H11-330630
Non-Patent Document 1: Applied Physics Letters Vol. 77, No. 23, Page 3707
Non-Patent Document 2: Japanese Journal of Applied Physics Vol. 40, Page L552

SUMMARY OF THE INVENTION

An object of the present invention is to provide a compact laser light source device using the ceramic laser medium. The laser light source device outputs laser beams under appropriate polarization control.

A laser light source according to one aspect of the present invention comprises a semiconductor laser light source configured to emit a laser beam; a laser medium excited by the semiconductor laser light source to emit light; two reflectors configured to work as a resonator to confine the light emitted by the laser medium; and a holder configured to hold the laser medium, wherein stress is generated in the laser medium formed of a ceramic material situated in the resonator so as to control a polarization direction of the light emitted by the laser medium.

A wavelength conversion laser light source according to another aspect of the present invention comprises a semiconductor laser light configured to emit a laser beam; a laser medium excited by the semiconductor laser light source to emit light; a wavelength converter configured to convert a wavelength of the light emitted by laser medium; two reflectors configured to work as a resonator to confine the light emitted by the laser medium; and a holder configured to hold the laser medium, wherein stress is generated in the laser medium formed of a ceramic material situated in the resonator so as to control a polarization direction of the light emitted by the laser medium.

A wavelength conversion laser light source according to another aspect of the present invention comprises a semiconductor laser light source configured to emit a laser beam; a laser medium excited by the semiconductor laser light source to emit light; a wavelength converter configured to convert a wavelength of the light emitted by laser medium; and two reflectors configured to work as a resonator to confine the light emitted by the laser medium, wherein the wavelength converter optically coupled to the laser medium is situated in the resonator, and stress is generated in the laser medium formed of a ceramic material situated in the resonator so as to control a polarization direction of the light emitted by the laser medium.

An image display device according to another aspect of the present invention comprises a laser light source configured to emit light; a laser driver configured to supply current to the laser light source; a modulator configured to modulate the light to form an image; a reflective mirror configured to reflect light output from the modulator; and a controller configured to drive the modulator, wherein the laser light source includes the aforementioned wavelength conversion laser light source.

DESCRIPTION OF THE INVENTION

Figure 1:
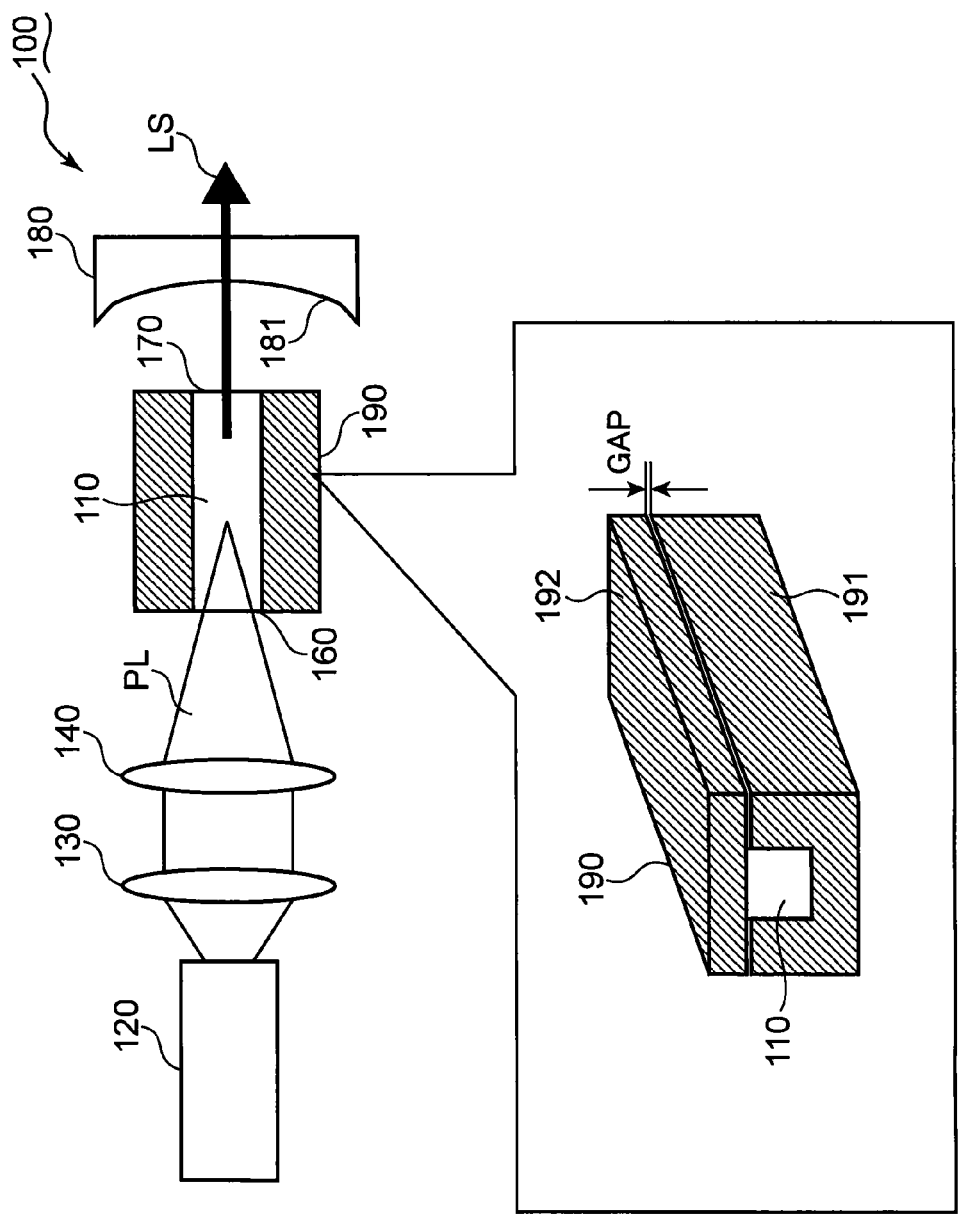
FIG. 1 is a schematic view of a laser light source according to the first embodiment.

Various embodiments of laser light sources, wavelength conversion laser light sources and image display devices are described with reference to the accompanying drawings. In the drawings, the same reference numerals are assigned to the same elements. Because descriptions about the same elements are redundant, the descriptions of the same elements are omitted.

A conventional laser light source using a ceramic laser medium is described with reference to FIGS. 28 and 29.

Figure 28:
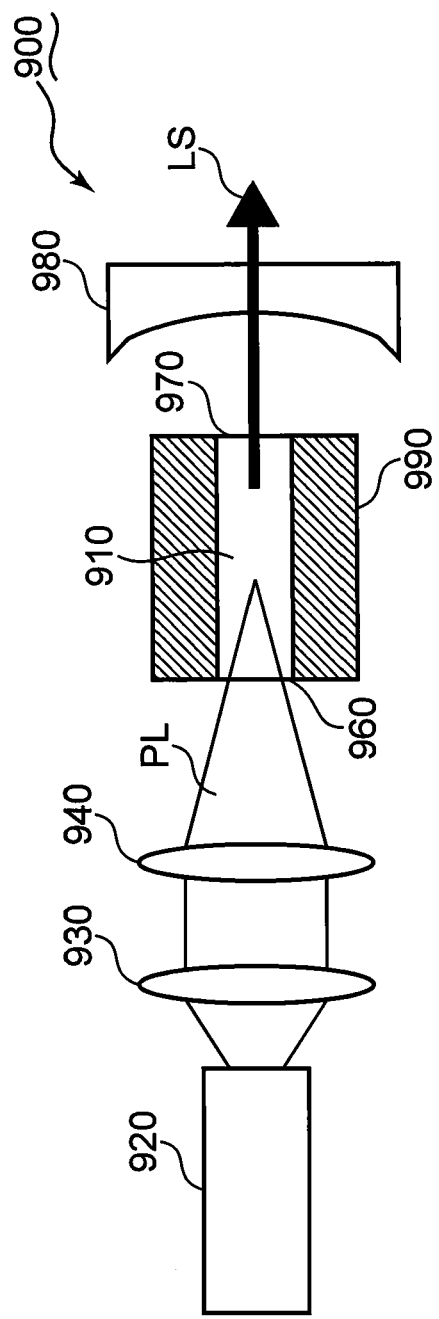
FIG. 28 is a schematic diagram of an infrared laser light source disclosed in Patent Document 1 or the short pulse laser light source disclosed in Non-Patent Document 1 or 2.

The laser light source 900 shown in FIG. 28 is generally referred to as an end-pumping type. The laser light source 900 comprises a ceramic laser medium (laser medium 910). Excitation light PL enters from the end surface of the laser medium 910.

The laser light source 900 further comprises an excitation light source 920 configured to emit the excitation light PL, a collimator lens 930 configured to shape the excitation light PL emitted from the excitation light source 920 into parallel light, and a condenser lens 940 configured to focus the excitation light PL from the collimator lens 930 to the laser medium 910.

The laser light source 900 further comprises a 1060 nm band high reflection optical film 960 formed on an incident end surface of the laser medium 910 to which the excitation light PL enters, a 1060 nm band high transmission optical film 970 formed on an exit end surface opposite to the incident end surface, an output mirror 980 situated beside the exit end surface of the laser medium 910, and a holder 990 configured to hold the laser medium 910. Consequently, a resonator is formed to cause laser resonance between the high reflection optical film 960 and the output mirror 980. Due to the laser resonance in the resonator, a 1060 nm band of oscillating light LS is output from the laser light source 900.

Figure 29:
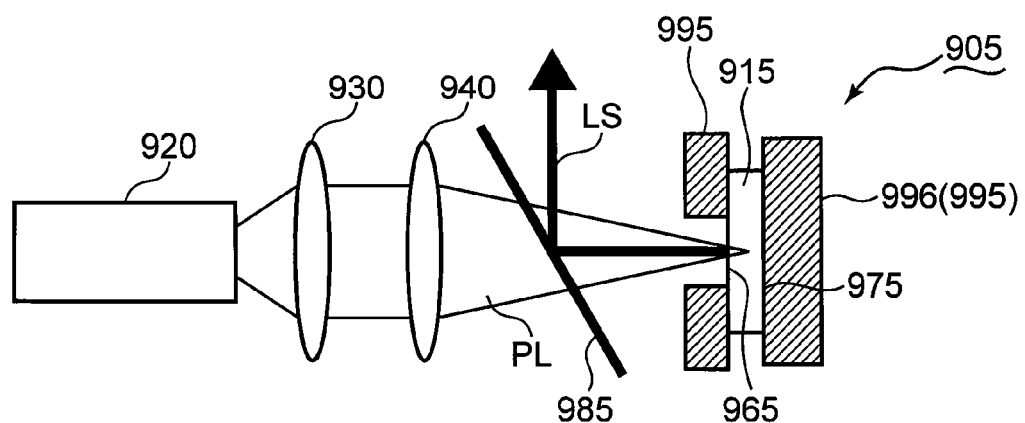
FIG. 29 is a schematic diagram of a disc laser light source disclosed in Patent Document 2.

FIG. 29 shows an end-pumping type laser light source 905. The laser light source 905 comprises a discoid laser medium 915. The laser light source 905 shown in FIG. 29 is generally referred to as a disc laser. Like the laser light source 900 described with reference to FIG. 28, the excitation light PL enters from an end surface of the ceramic laser medium (laser medium 915).

Like the laser light source 900 described with reference to FIG. 28, the laser light source 905 comprises an excitation light source 920, a collimator lens 930 and a condenser lens 940. The condenser lens 940 focuses the excitation light PL emitted from the excitation light source 920 to the laser medium 915. The laser medium 915 thereby emits oscillating light LS. It should be noted that, unlike the laser light source 900 described with reference to FIG. 28, the oscillating light LS is output from the same plane as the surface to which the excitation light PL enters.

The laser light source 905 further comprises 1060 nm band high reflection optical films 965, 975 formed on both end surfaces of the laser medium 915. The high reflection optical films 965, 975 work as a laser resonator. The oscillating light LS with 1060 nm band, which is oscillated in the laser resonator, is output from the end surface of the laser medium 915 to which the excitation light PL has been input.

The laser light source 905 further comprises a beam splitter 985 configured to split the oscillating light LS. The oscillating light LS is output via the beam splitter 985.

The laser medium 915 of the laser light source 905 (disc laser) is flattened. The laser light source 905 comprises a holder 995 configured to hold the laser medium 915. The holder 995 includes a holding plate 996 to which the flattened laser medium 915 is attached. According to the laser light source 905 described with reference to FIG. 29, since the flattened laser medium 915 is attached to the holding plate 996, heat may be efficiently removed from the laser medium 915.

The present inventors have figured out that it is difficult to apply the laser light sources 900, 905, which use the aforementioned ceramic laser medium (laser mediums 910, 915), to applications such as wavelength conversion since the laser-oscillated light becomes random polarization.

Conventionally, it has been known that YAG (yttrium aluminum garnet) crystals that are one of laser mediums oscillate only in random polarization. Accordingly, in order to achieve single polarization, typically, a polarization controller is inserted into the laser resonator. The present inventors have figured out that the insertion of the polarization controller into the laser resonator increases loss in the resonator in addition to the conventional problem of enlarging the laser system. The present inventors have also figured out that the increased loss in the resonator results in decreased conversion efficiencies from the input excitation light to the laser beam.

The present inventors have also figured out that the polarization ratio may be improved by generating local stress in the laser medium to address the aforementioned problems associated with the laser light source using the ceramic laser medium. The first to fourth embodiments described below have been devised on the basis of the aforementioned knowledge.

First Embodiment

FIG. 1 is a schematic view of a laser light source according to the first embodiment. The laser light source according to the first embodiment is described with reference to FIG. 1.

The laser light source 100 comprises a ceramic laser medium (laser medium 110), and a holder 190 configured to hold the laser medium 110. The laser light source 100 according to the present embodiment is characterized by the laser medium 110 and the holder 190. The structure of the holder 190 described below contributes to controlling a polarization direction of the light emitted by the laser medium 110 to achieve single polarization.

Like the laser light source 900 described with reference to FIG. 28, the laser light source 100 according to the present embodiment for emitting the laser beam further comprises an excitation light source 120 which emits excitation light PL, a collimator lens 130 which shapes the excitation light PL emitted from the excitation light source 120 into parallel light, and a condenser lens 140 which focuses the excitation light PL from the collimator lens 130 to the laser medium 110. The laser medium 110 is excited by the excitation light PL from the excitation light source 120 to emit oscillating light LS. In this embodiment, the excitation light source 120 is exemplified as the semiconductor laser light source.

Like the laser light source 900 described with reference to FIG. 28, the laser light source 100 according to the present embodiment further comprises a 1060 nm band high reflection optical film 160 formed on an incident end surface of the laser medium 110 to which the excitation light PL enters, a 1060 nm band high transmission optical film 170 formed on an exit end surface opposite to the incident end surface, and an output mirror 180 situated beside the exit end surface of the laser medium 110. Consequently, a resonator is formed to cause laser resonance between the high reflection optical film 160 and the output mirror 180. Due to the laser resonance in the resonator, oscillating light LS with 1060 nm band is output from the laser light source 100. In this embodiment, the high reflection optical film 160 and the output mirror 180 are exemplified as the reflectors.

(Holder Structure: First Structure)

The holder 190 configured to hold the laser medium 110 comprises, for example, a main body 191 having a C-shaped cross section, and a lid 192 which covers an opening formed on the top surface of the main body 191. The laser medium 110 formed from a ceramic material is held in a space (an internal space of the resonator formed between the high reflection optical film 160 and the output mirror 180) defined by the main body 191 and the lid 192.

The laser medium 110 is stored in the main body 191. The lid 192 is subsequently attached to the main body 191. As shown in FIG. 1, a gap (void) of 100 to 500 µm is formed between the main body 191 and the lid 192.

The lid 192 is fixed to the main body 191 by means of suitable fixtures such as screws. The lid 192 generates uneven stress in the laser medium 110 due to the gap formed between the main body 191 and the lid 192. The generation of the uneven stress contributes to the single polarization of the polarization direction of the laser beam described later.

Figure 2:
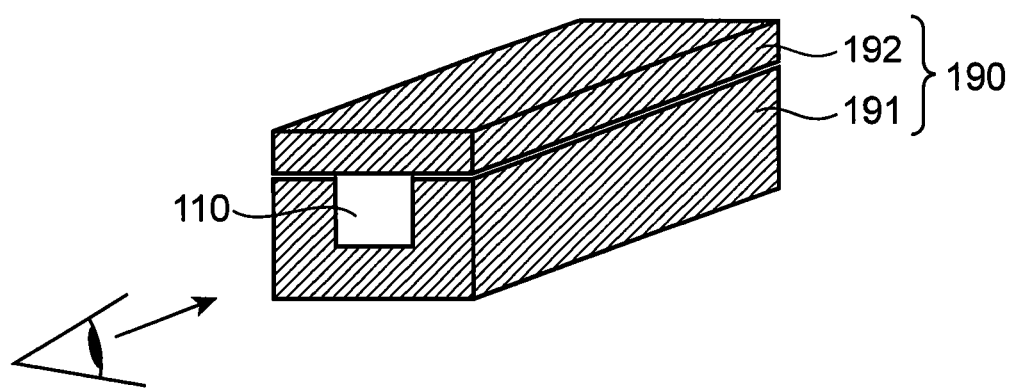
FIG. 2 is a schematic perspective view of a holder of the laser light source and a laser medium held by the holder shown in FIG. 1.
Figure 3:
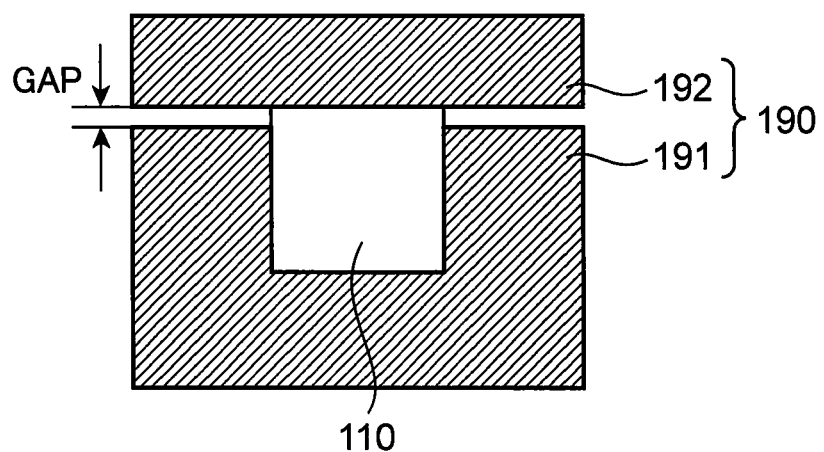
FIG. 3 is a schematic view from a direction of the arrow depicted in FIG. 2 to show the holder and the laser medium held by the holder.
Figure 4:
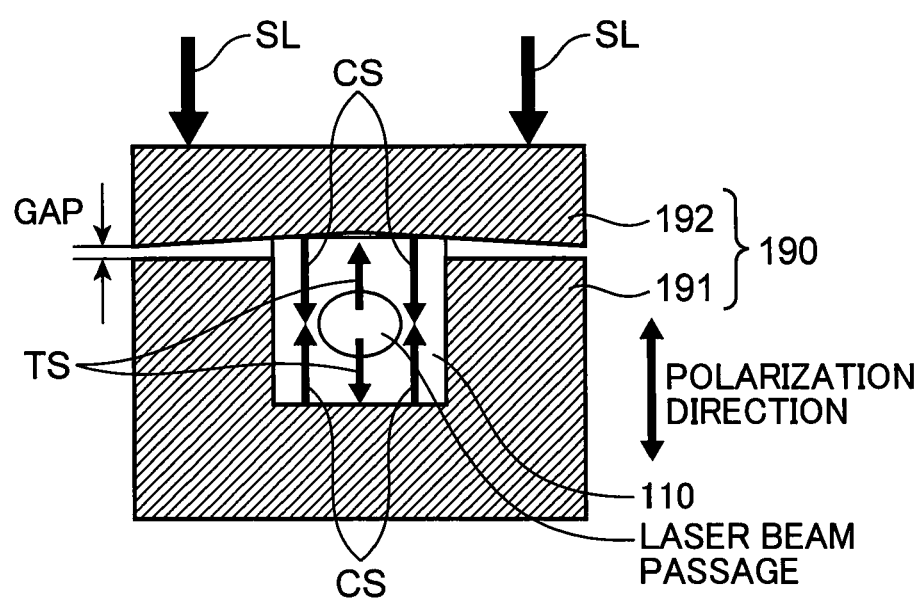
FIG. 4 is a schematic view from the direction of the arrow depicted in FIG. 2 to show the holder and the laser medium held by the holder.

FIG. 2 is a schematic perspective view of the holder 190 and the laser medium 110 held by the holder 190. FIGS. 3 and 4 are schematic views of the holder 190 and the laser medium 110 held by the holder 190 viewed from the direction of the arrow shown in FIG. 2. The stress is not generated in the laser medium 110 shown in FIG. 3 whereas the stress is generated in the laser medium 110 shown in FIG. 4. The stress generated in the laser medium 110 is described with reference to FIGS. 2 to 4.

As shown in FIG. 3, the lid 192 is floating from the main body 191 due to the laser medium 110 in the main body 191. For example, if a tightening torque of the screw for connecting the lid 192 and the main body 191 is set to 50 cN·m, the gap between the lid 192 and the main body 191 is set to 300 µm. It should be noted that the screw is screwed in the left and right areas beside the laser medium 110 to fasten the lid 192 to the main body 191.

If the lid 192 is fastened to the main body 191 by the screw, the lid 192 is bent, so that the gap between the lid 192 and the main body 191 becomes narrow. The gap between the lid 192 and the main body 191 shown in FIG. 4 is, for example, 100 µm. Therefore the stress SL is generated in the lid 192.

As shown in FIG. 4, since the lid 192 is bent upward, the stress SL generated in the left and right areas of the lid 192 causes vertical compression stress CS at the left and right areas near the edge of the top surface of the laser medium 110 without causing compression stress CS at the center area between the left and right areas. Consequently, vertical tensile strength TS is caused in the center area of the laser medium 110. In this embodiment, the center area of the laser medium 110 is exemplified as the first area. The left and right areas of the center area are exemplified as the second and third areas.

The holder 190 shown in FIGS. 2 to 4 may apply the stress to the laser medium 110 by means of the lid 192. Consequently, the tensile stress TS is caused in the center area of the laser medium 110 through which the laser beam passes.

Figure 5:
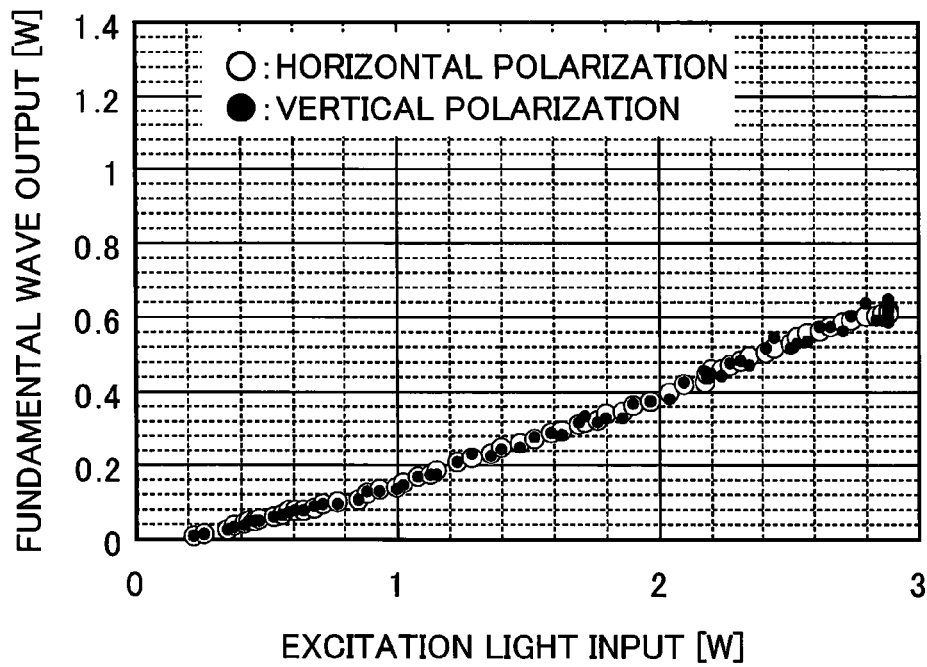
FIG. 5 is a graph showing experimental results about single polarization.
Figure 6:
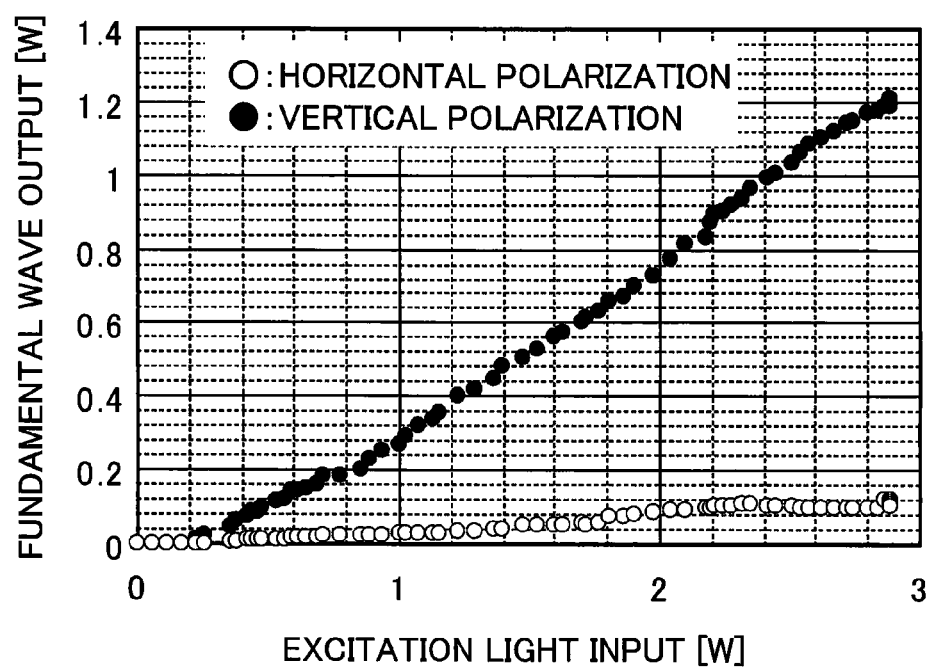
FIG. 6 is a graph showing experimental results about single polarization.

FIGS. 5 and 6 are graphs showing experimental results about the single polarization. FIG. 5 shows the experimental results under a condition without the stress caused in the laser medium 110. FIG. 6 shows the experimental results under a condition with the stress caused in the laser medium 110 according to principles of this embodiment. The experimental results about the single polarization are described with reference to FIGS. 1 to 6 and FIG. 28.

In the experiment of the single polarization, a YAG (yttrium aluminum garnet) ceramic, to which 2% of Nd (neodymium) was added as laser active ions, was used as the ceramic laser medium (laser medium 110). A semiconductor laser light source to cause an oscillation wavelength of 807 nm was used as the excitation light source 120.

As shown in FIG. 1, the output mirror 180 comprises a curved surface 181 which faces the laser medium 110. A curvature radius of the curved surface 181 was set so that the oscillated laser beam with 1060 nm band became approximately 100 μm in diameter. The condenser lens 140 was situated to increase an overlap integral between the excitation light PL and the oscillated light with 1060 nm band.

The experimental results shown in FIG. 5 are a graph obtained without the stress caused in the laser medium 110. The experimental condition corresponded to the conventional laser light source (the laser light source 900 described with reference to FIG. 28). The experimental results shown in FIG. 6 were obtained by using the laser medium 110 to which stress was applied according to the principles described with reference to FIGS. 2 to 4.

As shown in FIG. 5, unless stress was caused in the laser medium 110, the vertical and horizontal polarizations of the light emitted from the laser light source 100 showed substantially equal output. This means that the light emitted from the laser light source 100 exhibited a random polarization without the stress caused in the laser medium 110.

On the other hand, if stress was caused in the laser medium 110 according to the principles described with reference to FIGS. 2 to 4, a polarization ratio of "10:1" was obtained. The present inventors confirmed that this polarization ratio was substantially consistent independently of a temperature or output change of the laser light source 100.

As described above, the holder 190 is formed to cause the stress in the laser medium 110 (ceramic laser medium), so that the tensile stress TS works in an area along the optical path of the light emitted by the laser medium 110 (the center area of the laser medium 110 extending in the longitudinal direction of the laser medium 110). The tensile stress TS caused in the area along the optical path of the light emitted by the laser medium 110 appropriately controls the polarization direction of the light, so that the polarization direction of the laser light source 100 becomes the single polarization. The structure of the holder 190 described in this embodiment is exemplified as the stress generation structure.

(Holder Structure: Second Structure)

Figure 7:
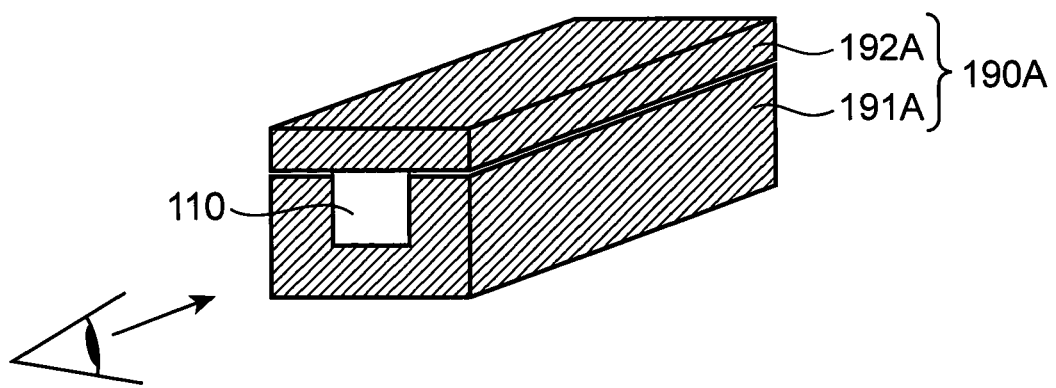
FIG. 7 is a schematic perspective view of another holder and laser medium of the laser light source shown in FIG. 1.
Figure 8:
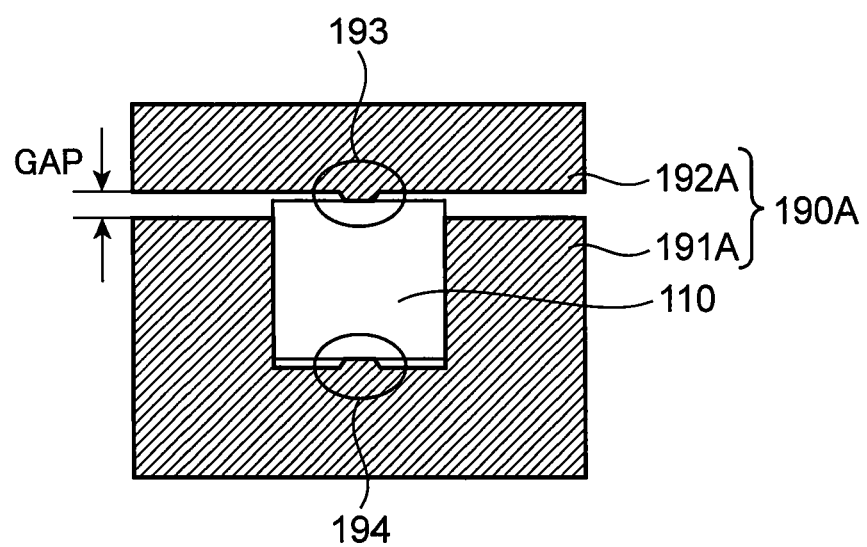
FIG. 8 is a schematic view from a direction of the arrow depicted in FIG. 7 to show the holder and the laser medium held by the holder.
Figure 9:
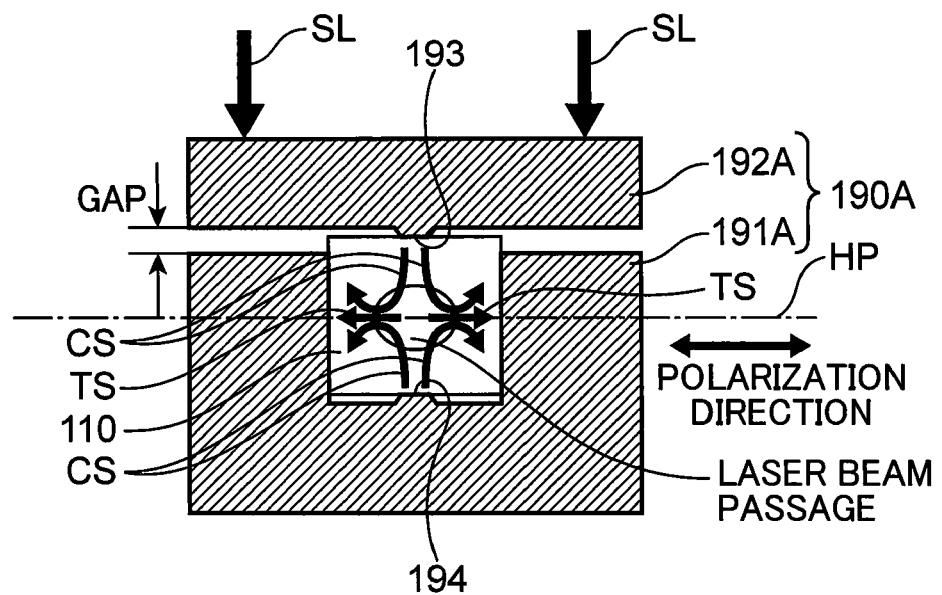
FIG. 9 is a schematic view from the direction of the arrow depicted in FIG. 7 to show the holder and the laser medium held by the holder.

FIGS. 7 to 9 schematically show another structure of a holder which holds the laser medium 110. FIG. 7 is schematic perspective views of the holder and laser medium 110 which is held by the holder. FIGS. 8 and 9 are schematic views from a direction of the arrow shown in FIGS. 7 to show the holder and the laser medium 110 which is held by the holder. The stress is not caused in the laser medium 110 shown in FIG. 8. The stress is caused in the laser medium 110 shown in FIG. 9. The stress caused in the laser medium 110 is described with reference to FIG. 1 and FIGS. 7 to 9.

Instead of the first structure of the holder 190, the laser light source 100 may use a second structure of a holder 190A configured to hold the laser medium 110. The holder 190A shown in FIGS. 7 to 9 may appropriately cause the stress in the laser medium 110, like the holder 190 of the first structure.

As shown in FIG. 7, the holder 190A comprises, for example, a main body 191A having a C-shaped cross section, and a lid 192A which covers an opening formed on the top surface of the main body 191A. The laser medium 110 formed with a ceramic material is held in a space defined by the main body 191A and the lid 192A (an internal space of the resonator formed between the high reflection optical film 160 and the output mirror 180).

As shown in FIG. 8, a rib 193 extending along an area through which the laser beam passes is formed on the bottom surface of the lid 192A. A rib 194 facing the rib 193 formed on the lid 192A is formed on the main body 191A. The laser medium 110 housed in the holder 190A are sandwiched between the ribs 193, 194.

The rib 193 formed on the bottom surface of the lid 192A and the laser medium 110 slightly protruding from the main body 191A cause a gap between the lid 192A and the main body 191A. Screws are screwed to fasten the lid 192A to the main body 191A in the left and right areas beside the laser medium 110.

If the lid 192A is fixed to the main body 191A, stress SL is caused in the left and right areas of the lid 192. Due to the stress SL, the ribs 193, 194 intensively press the laser medium 110 to cause compression stress CS in the laser medium 110. As a result of collision at the center of the cross section of the laser medium 110 between the downward compression stress CS from the rib 193 and the upward compression stress CS from the rib 194, a horizontal tensile stress TS is caused in the laser medium 110 on a horizontal plane HP across the center of the cross section of the laser medium 110. If the ceramic YAG is used as the laser medium 110, the polarization direction becomes the horizontal single polarization.

According to the structure of the holder 190A, the ribs 193, 194 may effectively cause the stress in the laser medium 110. Accordingly, like the holder 190, if the lid 192A is fastened to the main body 191A at a tightening torque of 50 cN·m by the screw, for example, a polarization ratio of "50:1" may be obtained. Therefore the second structure of the holder 190A may cause a greater polarization ratio than the first structure of the holder 190.

Second Embodiment

A ceramic laser medium on which a stress generation structure is formed to generate the stress is described in the context of the second embodiment. The stress generation structure provided to the ceramic laser medium appropriately contributes to the single polarization.

(Ceramic Laser Medium Structure: Third Structure)

Figure 10:
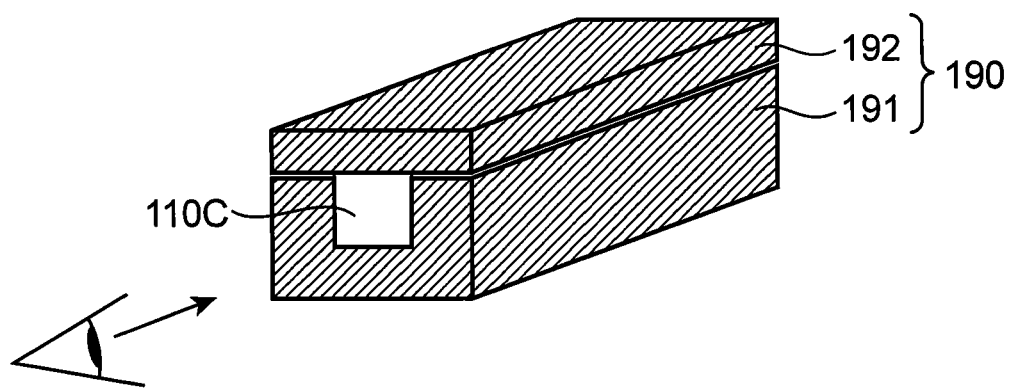
FIG. 10 is a schematic perspective view of a ceramic laser medium of a laser light source and a holder holding the ceramic laser medium according to the second embodiment.
Figure 11:
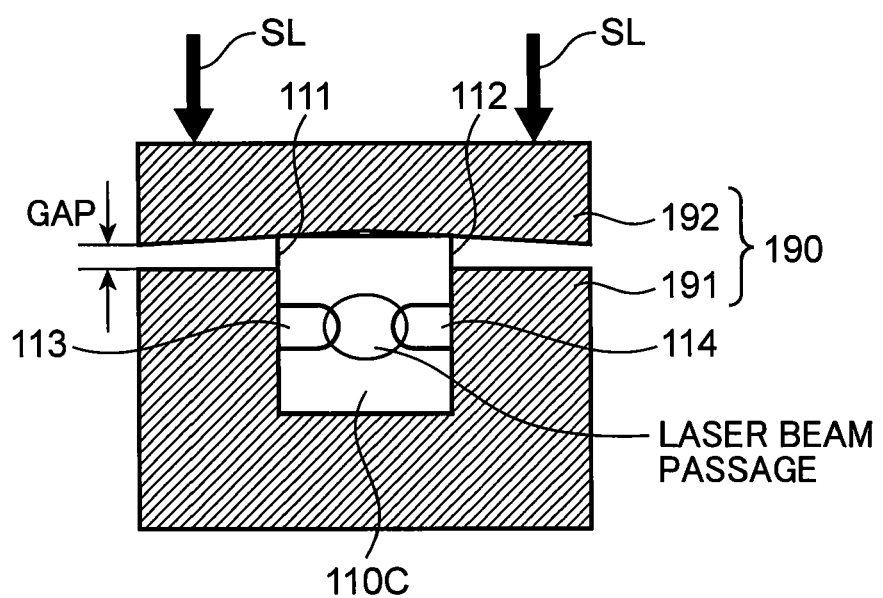
FIG. 11 is a schematic view from the direction of the arrow depicted in FIG. 10 to show the holder and the laser medium held by the holder.
Figure 12:
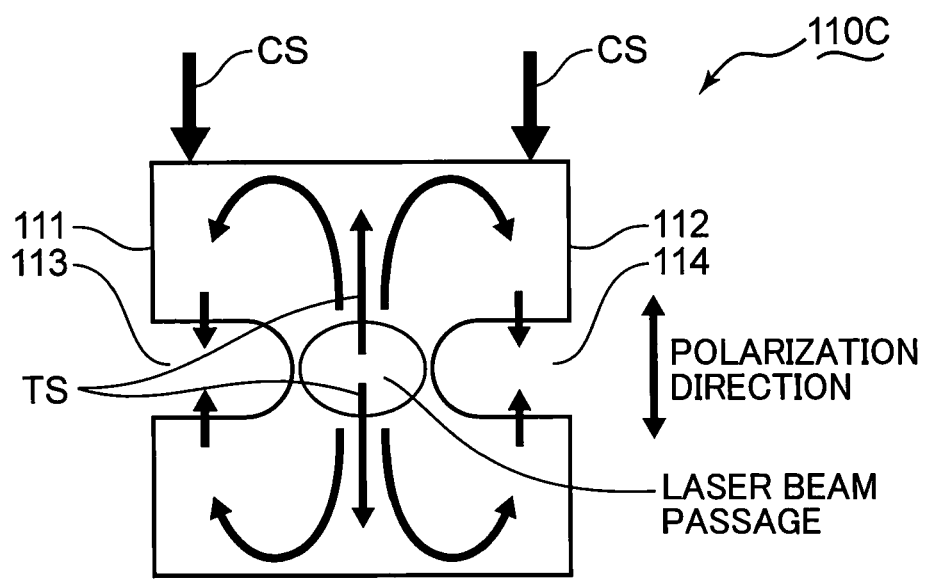
FIG. 12 is a schematic view from the direction of the arrow depicted in FIG. 10 to show the holder and the laser medium held by the holder.

FIGS. 10 to 12 schematically show the ceramic laser medium on which the stress generation structure is formed. FIG. 10 is a schematic perspective view of the ceramic laser medium and a holder configured to hold the ceramic laser medium. FIG. 11 is a schematic view from a direction of the arrow shown in FIG. 10 to show the holder and the laser medium held by the holder. FIG. 12 is a schematic view from the direction of the arrow shown in FIG. 10 to show the laser medium. The stress generation structure provided to the ceramic laser medium is described with reference to FIG. 1 and FIGS. 10 to 12.

The ceramic laser medium (laser medium 110C), on which the stress generation structure is formed, is housed in the holder 190 (the first structure) described in the context of the first embodiment. Instead of the laser medium 110 described in the context of the first embodiment, the laser light source 100 may emit a laser beam by means of the laser medium 110C on which the stress generation structure is formed.

As shown in FIG. 11, the laser medium 110C includes upright left and right surfaces 111, 112 between the lid 192 and the main body 191. The left surface 111 is provided with a groove 113 extending in the longitudinal direction of the laser medium 110C along an area through which the laser beam passes. Likewise, the right surface 112 is provided with a groove 114 extending in the longitudinal direction of the laser medium 110C along the area through which the laser beam passes. The grooves 113, 114 facilitate to cause strain and deformation in the laser medium 110C. In this embodiment, the groove 113 faces the groove 114. Alternatively, the grooves may be formed at different positions from each other in the laser medium if it is possible to increase the strain and the deformation in the laser medium. In this embodiment, the area through which the laser beam passes (center area of the laser medium 110C) is exemplified as the first area. The areas where the grooves 113, 114 are formed are exemplified as the second and third areas.

The area through which the laser beam passes is provided between the grooves 113, 114. Since the grooves 113, 114 facilitate to cause the strain and the deformation in the laser medium 110C as described above, the grooves 113, 114 may effectively contribute to causing tensile stress TS in the area through which the laser beam passes, which results in an increased polarization ratio. In this embodiment, the grooves 113, 114 are exemplified as the stress generation structure.

FIG. 11 shows the laser medium 110C fixed to the holder 190. Like the first embodiment, a YAG ceramic added with 2% of Nd may be used as the laser medium 110C. A semiconductor laser light source to cause a wavelength of 807 nm may be used as the excitation light source 120.

The curved surface 181 (refer to FIG. 1) of the output mirror 180 may be set so that the oscillated laser beam with 1060 nm band becomes approximately 100 µm in diameter. The condenser lens 140 is preferably situated so as to increase an overlap integral between the excitation light PL and the oscillated light with 1060 nm band.

The laser medium 110C has, for example, an end surface of 1 mm×1 mm and a length of 3 mm. The grooves 113, 114 are formed, for example, by means of a dicing saw. The grooves 113, 114 are, for example, approximately 200 µm in depth.

Like the first embodiment, if the lid 192 is fastened to the main body 191 by the screw, the lid 192 is bent, so that the gap between the lid 192 and the main body 191 becomes narrow. Since the lid 192 is bent upward, the lid 192 generates vertical compression stress CS in the left and right areas where the grooves 113, 114 are formed.

The compression stress CS escapes to the grooves 113, 114 (in other words, the laser medium 110C deforms so that the grooves 113, 114 is vertically shrinked). Consequently, greater tensile stress TS is caused in the area, through which the laser beam passes, so that the polarization ratio of the light with the single polarization increases.

The present inventors used the aforementioned laser medium 110C and holder 190 to examine the polarization ratio. The gap between the lid 192 and the main body 191 before causing the stress SL in the lid 192 was 500 µm. The present inventors fastened the lid 192 to the main body 191 by the screw until the gap of 500 µm became 300 µm, so that the stress SL was caused in the lid 192. It should be noted that a tightening torque of the screw was 50 cN·m. In this experiment, the present inventors observed a polarization ratio of "150:1".

FIG. 12 schematically shows the stress in the cross section of the laser medium 110C. As shown in FIG. 12, in the area through which the laser beam passes, the vertical tensile strength TS was caused. Accordingly, the polarization direction obtained in the aforementioned experiment became a vertical polarization.

(Ceramic Laser Medium Structure: Fourth Structure)

Figure 13:
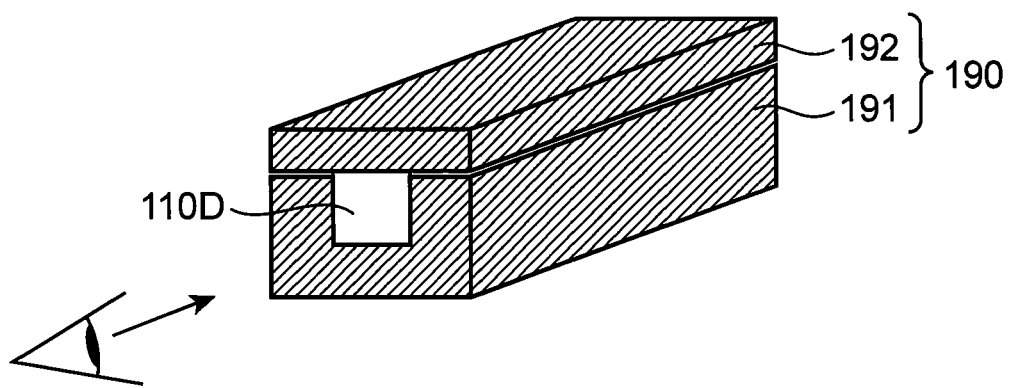
FIG. 13 is a schematic perspective view of another ceramic laser medium of the laser light source and the holder holding the ceramic laser medium according to the second embodiment.
Figure 14:
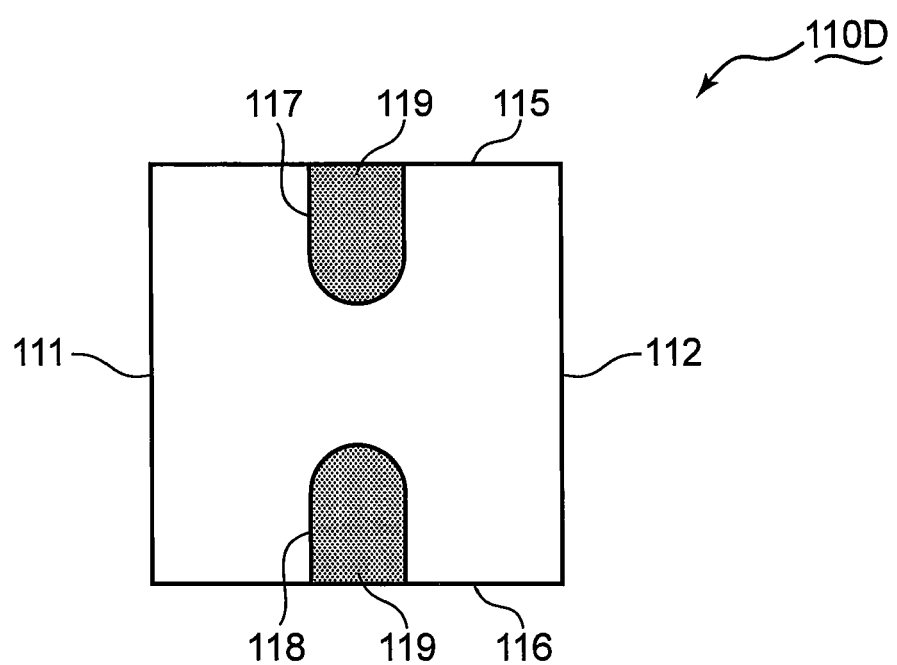
FIG. 14 is a schematic view from a direction of the arrow depicted in FIG. 13 to show the holder and the laser medium held by the holder.
Figure 15:
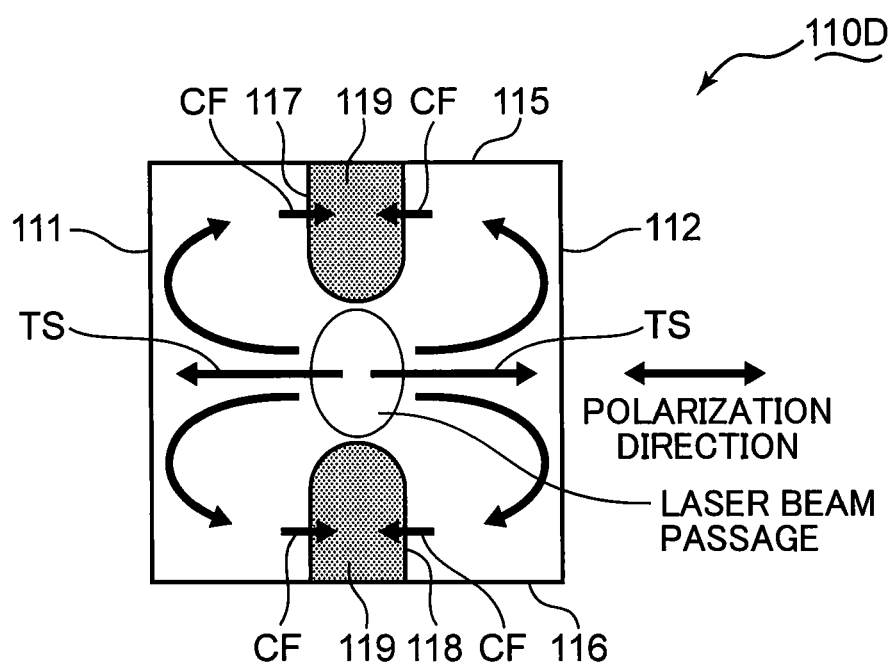
FIG. 15 is a schematic view from the direction of the arrow depicted in FIG. 13 to show the holder and the laser medium held by the holder.

FIGS. 13 to 15 schematically show a ceramic laser medium on which a stress generation structure is formed. FIG. 13 is a schematic perspective view of the ceramic laser medium and the holder which holds the ceramic laser medium. FIG. 14 is a schematic view from a direction of the arrow shown in FIG. 13 to show the holder and the laser medium held by the holder. FIG. 15 is a schematic view from the direction of the arrow shown in FIG. 13 to show the laser medium. The stress generation structure provided to the ceramic laser medium is described with reference to FIG. 1 and FIGS. 13 to 15.

The ceramic laser medium (laser medium 110D), on which the stress generation structure is formed, is housed in the holder 190 (first structure) described in the context of the first embodiment. Instead of the laser medium 110 described in the context of the first embodiment, the laser light source 100 may emit a laser beam by using the laser medium 110D on which the stress generation structure is formed.

As shown in FIG. 14, the laser medium 110D includes a top surface 115 and a bottom surface 116 which extend between the left and right surfaces 111, 112. The top surface 115 is provided with a groove 117 extending in the longitudinal direction of the laser medium 110D along an area through which the laser beam passes. Likewise, the bottom surface 116 is provided with a groove 118 extending in the longitudinal direction of the laser medium 110D along the area through which the laser beam passes. Alternatively, the grooves may be formed on the side surfaces of the laser medium.

The grooves 117, 118 facilitate strain and deformation in the laser medium 110D. In this embodiment, the groove 117 faces the groove 118. Alternatively, the grooves may be formed at different positions from each other in the laser medium if it is possible to increase the strain and the deformation in the laser medium 110D.

The stress generation structure includes resin 119 (adhesive) embedded in the grooves 117, 118. The grooves 117, 118 shrink if the resin 119 is cured. The shrinkage of the resin 119 in the grooves 117, 118 results in horizontal shrinkage of the grooves 117, 118, so that the stress is caused in the cross section of the laser medium 110D. In this embodiment, the resin 119 different in material from the ceramic laser medium 110D is exemplified as the filler. Alternatively, other materials (different from the laser medium) to shrink the groove formed in the laser medium may be used as the filler.

An area through which the laser beam passes is provided between the grooves 117, 118. Since the grooves 117, 118 facilitate the strain and the deformation in the laser medium 110D, like the grooves 113, 114 of the laser medium 110C described in the context of the "third structure", the grooves 117, 118 may efficiently contribute to causing the tensile stress TS in the area, through which the laser beam passes, to increase the polarization ratio. In this embodiment, the grooves 117, 118 are exemplified as the stress generation structure.

Since the resin 119 generates the stress in the laser medium 110D, the holder 190 does not have to cause stress in the laser medium 110D. Operations and effects of the resin embedded in the laser medium 110D are described with reference to FIG. 1 and FIGS. 13 to 15.

Like the first embodiment, a YAG ceramic added with 2% of Nd may be used as the laser medium 110D. A semiconductor laser light source to cause a wavelength of 807 nm may be used as the excitation light source 120.

The curved surface 181 (refer to FIG. 1) of the output mirror 180 may be set so that the oscillated laser beam with 1060 nm band becomes approximately 100 µm in diameter. The condenser lens 140 is preferably situated so as to increase an overlap integral between the excitation light PL and the oscillated band light with 1060 nm.

The laser medium 110D has, for example, an end surface of 1 mm×1 mm and a length of 3 mm. The grooves 117, 118 are formed, for example, by means of a dicing saw. The grooves 117, 118 are, for example, approximately 200 µm in depth. Unlike the laser medium 110C described in the context of the third structure, adhesive (resin 119) poured in the grooves 117, 118 causes the shrinkage (cure shrinkage) to cause the tensile stress TS in the cross section of the laser medium 110D, in particular, the area through which the laser beam passes. In this embodiment, thermoset adhesive of which base material is epoxy resin may be appropriately used as the adhesive. In order to generate the tensile stress TS, the adhesive preferably has cure shrinkage of 5% or more. In order to reduce a change in polarization ratio because of a temperature of the laser medium 110D, the adhesive preferably has a linear expansion coefficient of 10 ppm/° C. or less.

If the adhesive (resin 119) shrinks in the grooves 117, 118 to cause contractile force CF in areas above and below the area through which the laser beam passes, the high tensile stress TS is caused in the area through which the laser beam passes. Thus, a polarization ratio of the light with the single polarization increases.

The present inventors used the aforementioned laser medium 110D and resin 119 to examine the polarization ratio, and observed a polarization ratio of "100:1".

FIG. 15 schematically shows the stress in the cross section of the laser medium 110D. As shown in FIG. 15, the horizontal tensile stress TS in FIG. 15 is caused in the area through which the laser beam passes. Accordingly, the polarization obtained in the aforementioned experiment became horizontal.

In this embodiment, the resin 119 is used as the filler to be filled in the grooves 117, 118. Alternatively, materials (for example, a ceramic material) other than the resin may be used as the filler if the material decreases in volume after the material is filled. For example, after a groove is formed in the ceramic laser medium, a green sheet or paste formed of a different ceramic material from the ceramic laser medium may be filled and subsequently calcinated. Such a method may result in the same effect as the aforementioned effect.

Figure 16:
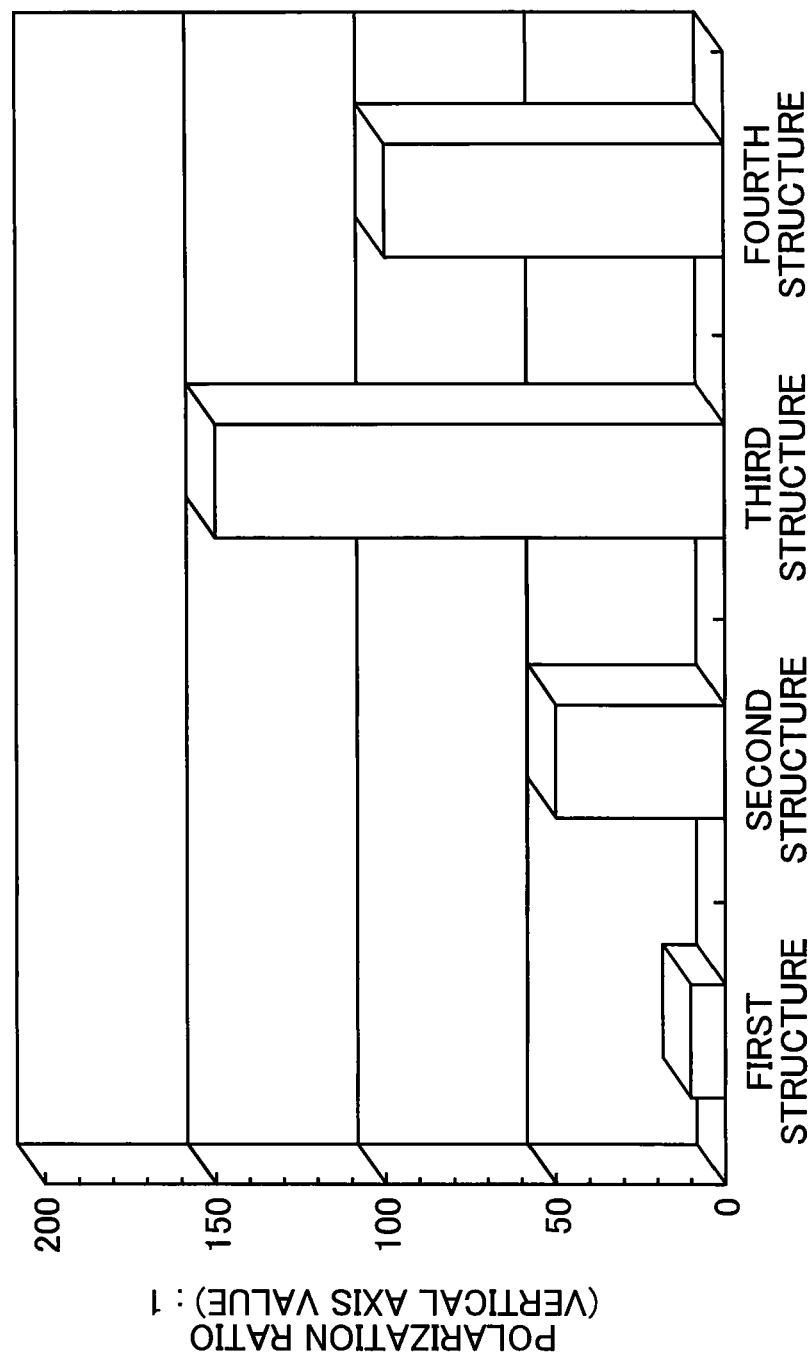
FIG. 16 is a graph comparing polarization ratios.

FIG. 16 is a graph showing a polarization ratio obtained from the first and second structures described in the context of the first embodiment and a polarization ratio obtained from the third and fourth structures described in the context of the second embodiment. A comparison between the polarization ratios is described with reference to FIGS. 4, 9, 12, 15 and 16.

The third and fourth structure and the fourth structure with the grooves 113, 114, 117, 118 may cause greater tensile stress in the area through which the laser beam passes than the first and second structures without the grooves 113, 114, 117, 118. Accordingly, in order to obtain a relatively high polarization ratio, it is preferable to use the third and/or fourth structures described in the context of the second embodiment.

Third Embodiment

The single polarization which utilizes an overlap between the excitation light exciting the ceramic laser medium and the oscillating light generated by photo-excitation is described in the context of the third embodiment.

Figure 17:
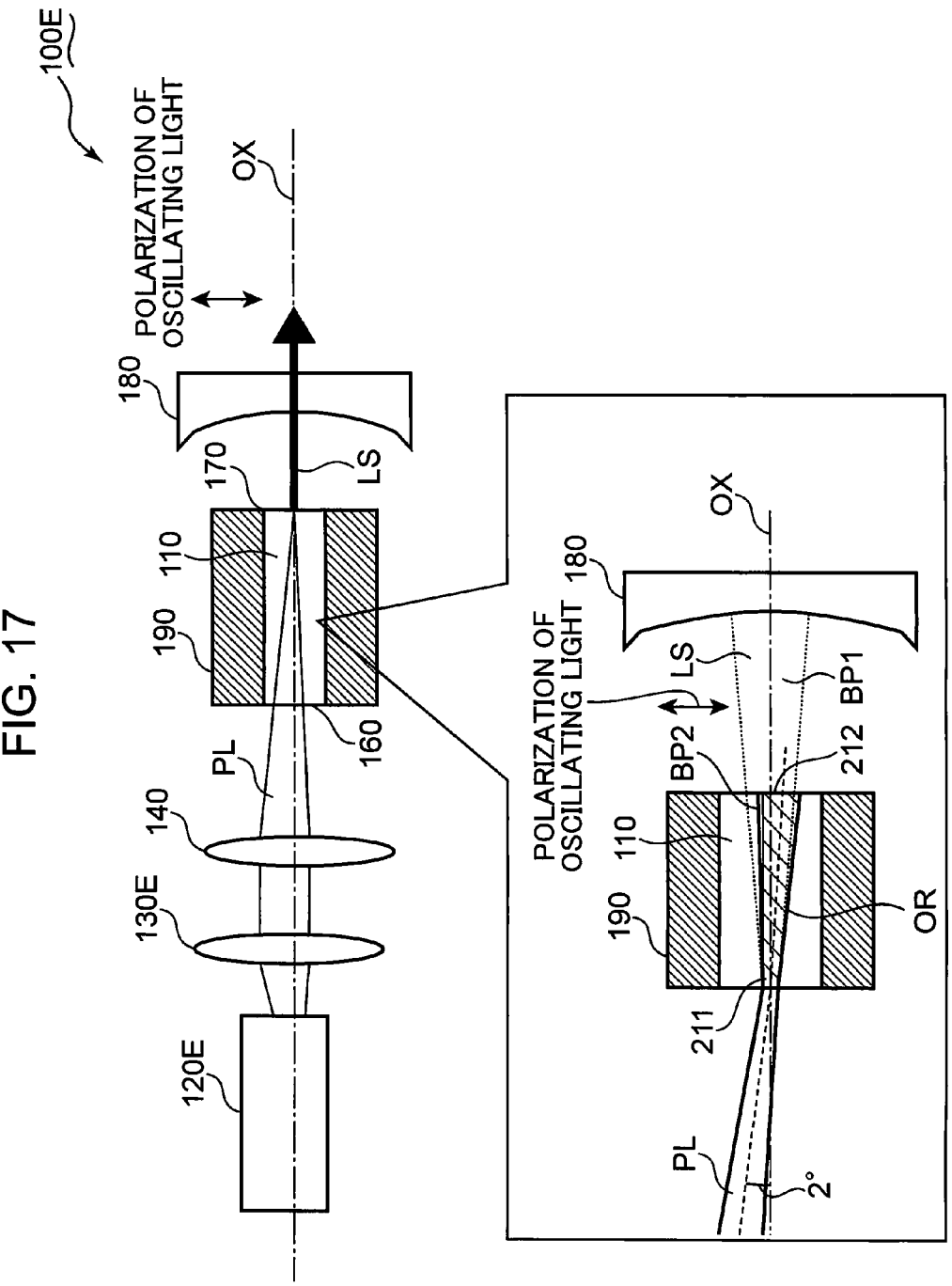
FIG. 17 is a schematic view of a laser light source according to the third embodiment.

FIG. 17 is a schematic view of a laser light source according to the third embodiment. The laser light source according to the third embodiment is described with reference to FIG. 17. The same elements as the elements described in the context of the first and/or second embodiments are given the same reference numerals. Descriptions relating to the first and/or second embodiments are incorporated by reference for the aforementioned elements.

Like the laser light source 100 described in the context of the first embodiment, the laser light source 100E comprises a laser medium 110, a holder 190 which holds the laser medium 110, an output mirror 180 situated beside the exit end surface of the laser medium 110, and a condenser lens 140 which focuses the excitation light PL to the laser medium 110. The optical axis OX among the condenser lens 140, the laser medium 110 and the output mirror 180 is linearly and straightly aligned. The laser light source 100E further comprises a 1060 nm band high reflection optical film 160 formed on an incident end surface of the laser medium 110 to which the excitation light PL enters, and a 1060 nm band high transmission optical film 170 formed on an exit end surface opposite to the incident end surface. Thus, a resonator is formed to cause laser resonance between the high reflection optical film 160 and the output mirror 180.

The laser light source 100E further comprises an excitation light source 120E which emits excitation light PL, and a collimator lens 130E which shapes the excitation light PL emitted from the excitation light source 120E into parallel light. The optical axis between the excitation light source 120E and the collimator lens 130E is offset from the optical axis OX. The excitation light PL emitted from the excitation light source 120E enters the laser medium 110 via the collimator lens 130E and the condenser lens 140. Consequently, laser resonance is caused between the high reflection optical film 160 and the output mirror 180, so that the oscillating light LS is output via the output mirror 180.

In this embodiment, as described above, the single polarization is achieved by the excitation light source 120E and the collimator lens 130E which are displaced from the optical axis OX. The inclination of an incidence angle of the excitation light PL with respect to the optical axis OX is set in the same in-plane as the polarization direction of the oscillating light LS. In FIG. 17, since the polarization of the oscillating light LS is vertical, the inclination of the incidence angle of the excitation light PL with respect to the optical axis OX is set to a vertical direction. In this embodiment, the optical axis OX is an axis line along the optical path of the oscillating light LS emitted by the laser medium. The excitation light source 120E is exemplified as the semiconductor laser light source.

Figure 18:
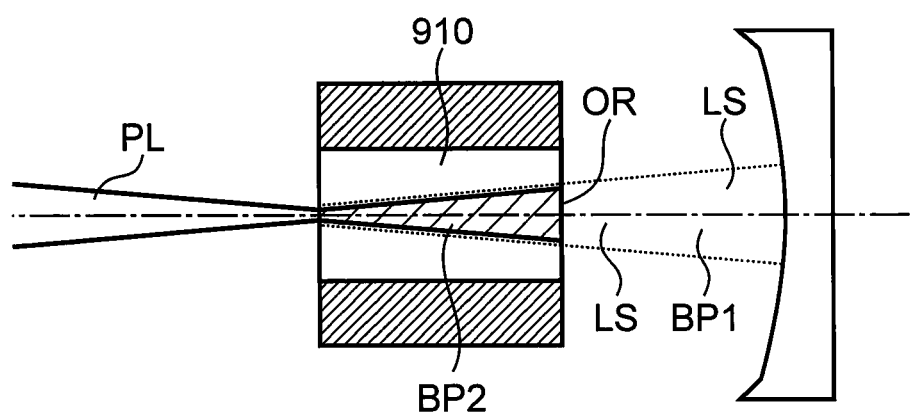
FIG. 18 is a schematic view of an optical design of a conventional laser light source.

FIG. 18 is a schematic view of an optical design of the laser light source 900 described with reference to FIG. 28. The optical design according to the present embodiment is compared to the conventional optical design with reference to FIGS. 17 and 18.

In order to efficiently convert the excitation light PL into the oscillating light LS, it is preferable to increase an overlap integral of the area OR where the excitation light PL overlaps with the oscillating light LS in the laser medium 910. Accordingly, a typical optical design is made such that a beam path BP2 of the excitation light PL completely coincides with a beam path BP1 of the oscillating light LS. Such a design concept is similarly applied to obtain the oscillating light LS by means of the laser medium 910 which causes oscillation with random polarization. The optical design typically has been made so that the overlap integral of the area OR where the excitation light PL and the oscillating light LS overlap is maximized.

As shown in FIG. 17, in this embodiment, the area OR where the excitation light PL and the oscillating light LS in the laser medium 110 overlap is inclined with respect to the optical axis OX. Accordingly, thermal strain is caused in the laser medium 110 (in other words, stress is generated in the laser medium 110). The resultant refractive-index distribution is biased with respect to the optical axis OX, which results in an increased polarization ratio. The present inventors confirmed the increase in polarization ratio under the conditions shown below.

The present inventors inclined the incidence angle of the excitation light PL with respect to the optical axis OX (inclination angle of 2° at the exterior corner) in the plane including the polarization direction of the oscillating light LS. The excitation light source 120E and the collimator lens 130E were situated so that the overlap integral between the excitation light PL and the oscillating light LS became maximized in the area 211 nearby the incident end surface of the laser medium 110 on which the excitation light PL was focused. Therefore the excited area was biased with respect to the optical axis OX in the area 212 nearby the exit end surface where the beam diameter of the oscillating light LS became maximized in the laser medium 110. The overlap integral between the excitation light PL and the oscillating light LS was approximately 60% in the area 212 near the exit end surface. On the other hand, since the beam diameter of the excitation light PL was small, the energy density became great. Therefore 90% or more of the input optical energy was absorbed in the range in which the there was the oscillating light LS.

As a result of the aforementioned optical layout, the laser medium 110 absorbed the excitation light PL and heated. Accordingly, the resultant refractive-index distribution was biased with respect to the optical axis OX in the area where the oscillating light LS existed in the laser medium 110 to control the polarization.

Figure 19:
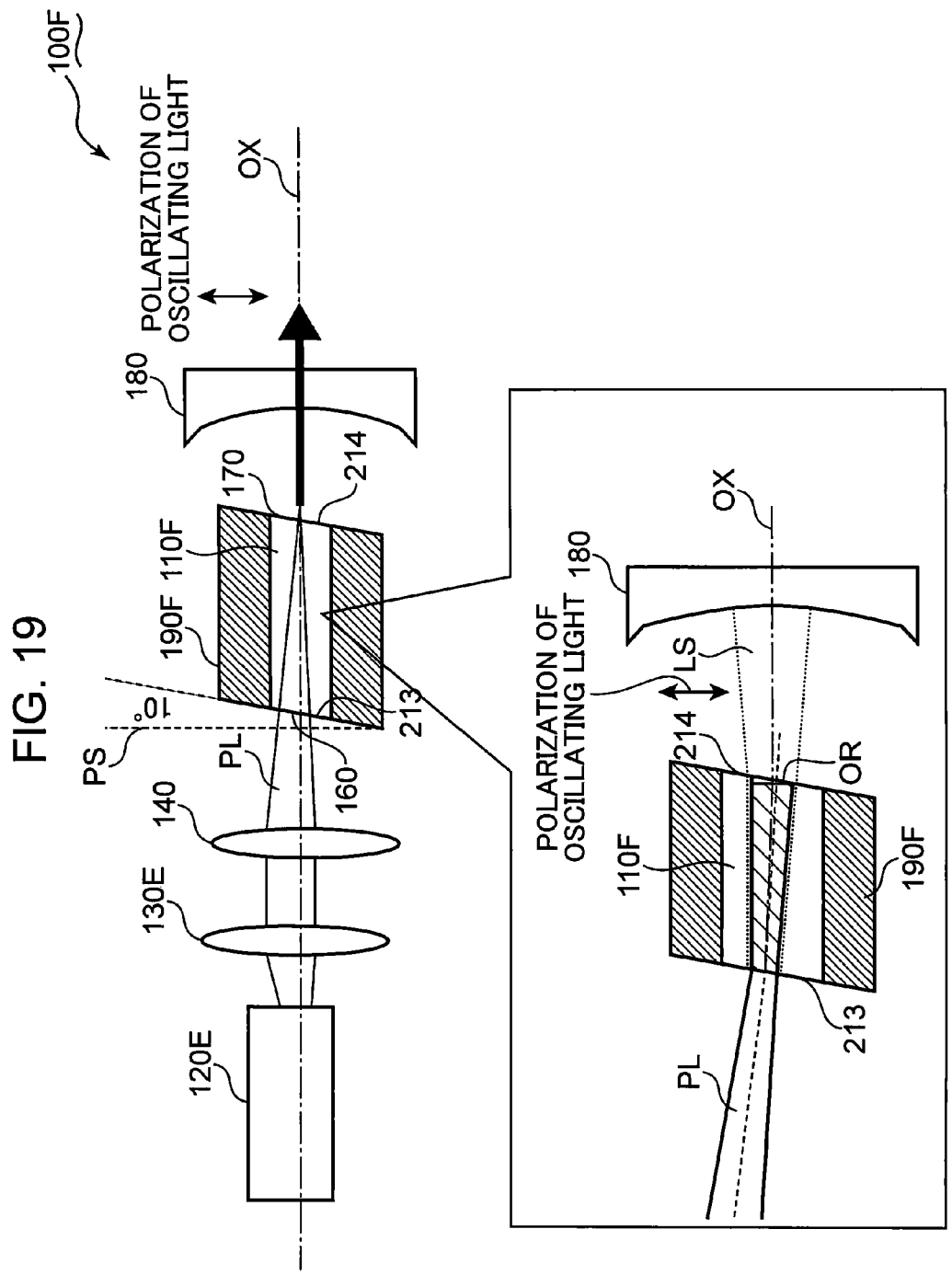
FIG. 19 is a schematic view of another laser light source which utilizes overlap between excitation light exciting the ceramic laser medium and oscillating light generated by photo-excitation in order to achieve single polarization.

FIG. 19 is a schematic view of another laser light source configured to achieve the single polarization by utilizing the overlap between the excitation light which excites the ceramic laser medium and the oscillating light which is generated by photo-excitation. The same elements as the elements used in the laser light source 100E described with reference to FIG. 17 are given the same reference numerals. Descriptions relating to the laser light source 100E with reference to FIG. 17 are incorporated by reference for the aforementioned elements. The other laser light source configured to achieve the single polarization by utilizing the overlap between the excitation light which excites the ceramic laser medium and the oscillating light which is generated by photo-excitation is described with reference to FIG. 19.

Like the laser light source 100E described with reference to FIG. 17, the laser light source 100F comprises an excitation light source 120E, a collimator lens 130E, a condenser lens 140 and an output mirror 180.

The laser light source 100F comprises a laser medium 110F which emits oscillating light LS, and a holder 190F which holds the laser medium 110F. The laser medium 110F includes an incident end surface 213 and an exit end surface 214 inclined with respect to a plane PS, which is orthogonal to the optical axis OX. The inclination angle of the incident and exit end surfaces 213, 214 with respect to the plane PS is set, for example, to 10°. The laser light source 100F further comprises a high reflection optical film 160 formed on the incident end surface 213 and a high transmission optical film 170 formed on the exit end surface 214.

The excitation light PL from the excitation light source 120E is refracted at the inclined incident end surface 213, and then travels in the laser medium 110F. Consequently, the area OR where the excitation light PL and the oscillating light LS overlap in the laser medium 110 becomes inclined with respect to the optical axis OX, so that thermal stress is caused in the laser medium 110F. Therefore the resultant refractive-index distribution biased with respect to the optical axis OX increases the polarization ratio.

In this embodiment, the laser medium 110F includes the incident and exit end surfaces 213, 214 inclined with respect to the plane PS, which is orthogonal to the optical axis OX. Alternatively, only the incident end surface may be inclined with respect to the plane PS.

Figure 20:
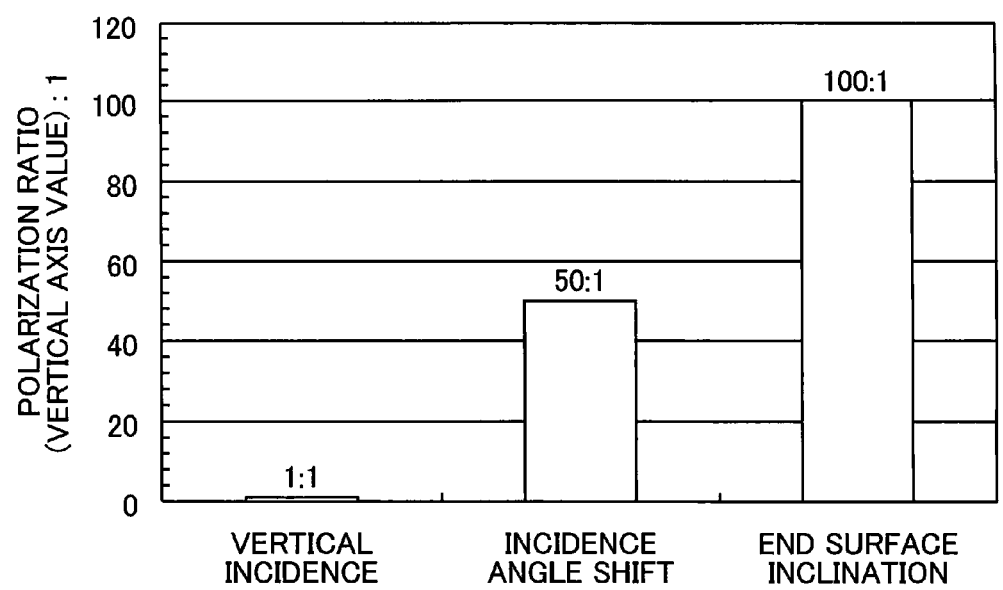
FIG. 20 is a graph showing effects of the single polarization.

FIG. 20 is a graph showing effects of achieving the single polarization caused by the principles according to this embodiment. The term "vertical incidence" shown in FIG. 20 means a condition in which the excitation light PL vertically enters the incident end surface of the laser medium 910 as shown in FIG. 28. The term "incidence angle shift" shown in FIG. 20 means a condition in which the excitation light PL is inclined with respect to the optical axis OX as shown in FIG. 17. The term "end surface inclination" shown in FIG. 20 means a condition in which the incident end surface 213 of the laser medium 110F is inclined as shown in FIG. 19. The vertical axis of the graph in FIG. 20 represents the polarization ratio. The effects of achieving the single polarization caused by the principles according to the present embodiment are described with reference to FIGS. 17, 19, 20 and 28.

The polarization ratio corresponding to the "incidence angle shift" shown in FIG. 20 was obtained under a condition in which the excitation light PL entered the laser medium 110 at an inclination angle of 5° with respect to the optical axis OX. The polarization corresponding to the "end surface inclination" shown in FIG. 20 was obtained under a condition in which the excitation light PL entered the incident end surface 213 which was inclined by 10° with respect to the plane PS, which was perpendicular to the optical axis OX.

As shown in FIG. 20, a greater polarization ratio was obtained under the conditions of "incidence angle shift" and "end surface inclination" than the conditions of "vertical incidence". In particular, a higher polarization ratio was achieved under the conditions of "end surface inclination" since it was possible to increase the overlap integral between the excitation light PL and the oscillating light LS in the laser medium 110F in addition to the effect of selecting the polarization direction at the exit end surface 214 of the laser medium 110F.

The effect of the increase in polarization ratio shown in FIG. 20 was suitably obtained under the conditions of "incidence angle shift" in which the inclination angle of the excitation light PL with respect to the optical axis OX was "5°±2.5°". The effect of the increase in polarization ratio shown in FIG. 20 was suitably obtained under the conditions of "end surface inclination" in which the inclination angle of the incident end surface 213 with respect to the plane PS perpendicular to the optical axis OX was "10°±5°".

Fourth Embodiment

The single polarization by means of a density distribution of a material provided in the ceramic laser medium is described in the context of the fourth embodiment.

Figure 21:
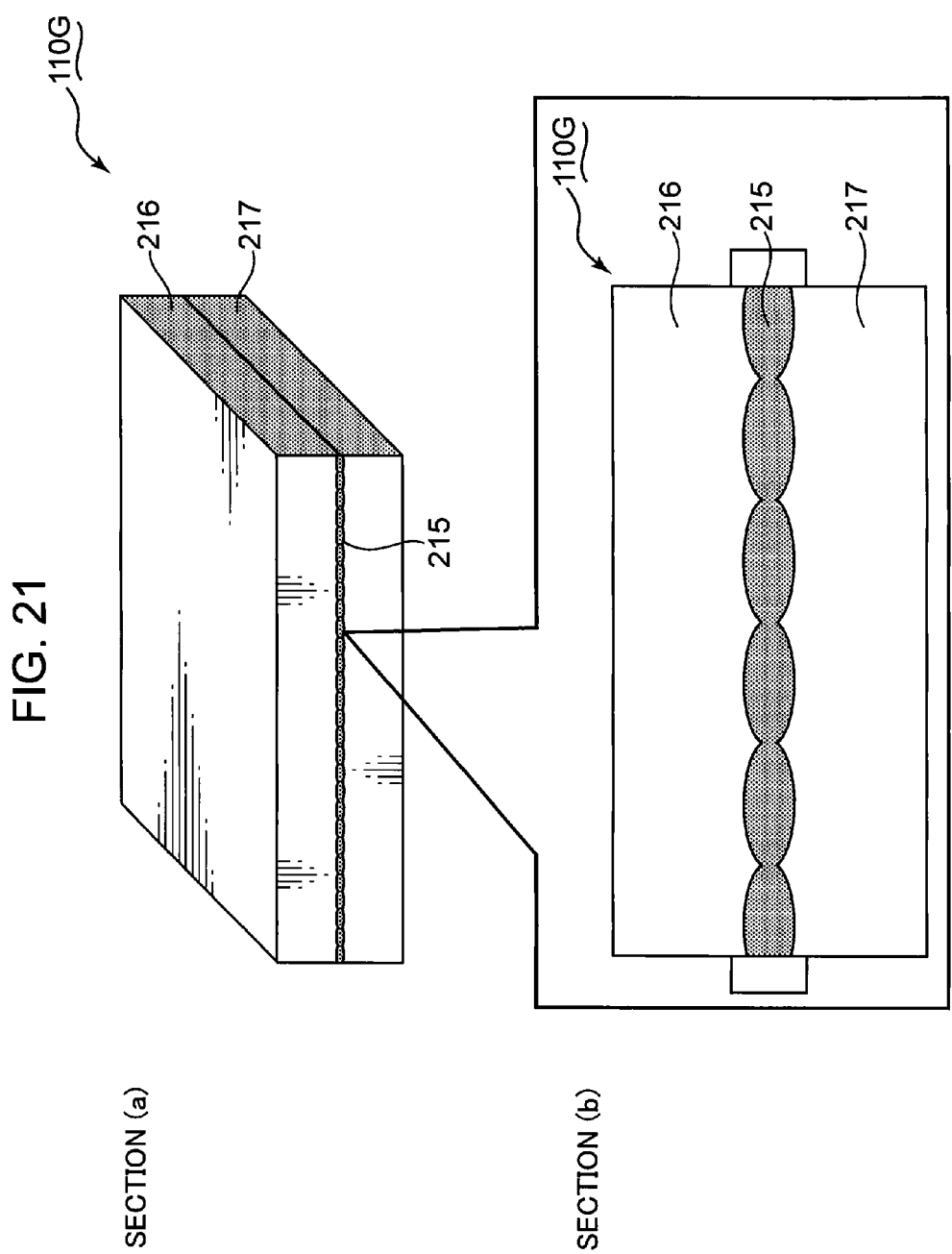
FIG. 21 is a schematic view showing a ceramic laser medium which is used in a laser light source according to the fourth embodiment.

FIG. 21 schematically shows a ceramic laser medium. Section (a) of FIG. 21 is a schematic perspective view of the ceramic laser medium. Section (b) of FIG. 21 is a schematic cross section of the ceramic laser medium.

The laser medium 110G (ceramic laser medium) comprises a first ceramic element 215 containing laser activator, a second ceramic element 216 without the laser activator, and a third ceramic element 217 without the laser activator. The first ceramic element 215 is sandwiched between the second and third ceramic elements 216, 217 (sandwich structure).

As shown in section (b) of FIG. 21, the first ceramic element 215 has, for example, a cross section shape where ovals having a long axis length of approximately 200 μm and a short axis length of approximately 80 μm are connected. By changing the density of the materials among the first to third ceramic elements 215, 216 and 217, the effect of the increase in polarization ratio, which is similar to the effect described in the context of the second embodiment, may be achieved.

The material density among the first to third ceramic elements 215, 216 and 217 may also be changed on the basis of a change in sintering conditions (pressure) of the first to third ceramic elements 215, 216 and 217. Alternatively, the material density among the first to third ceramic elements 215, 216 and 217 may be changed on the basis of a change in material among the first to third ceramic elements 215, 216 and 217.

The present inventors confirmed the effect of the increase in polarization ratio by changing the materials among the first to third ceramic elements 215, 216 and 217.

The present inventors selected Nd:YGG (yttrium gallium garnet) as a material of the first ceramic element 215 containing laser activator, and YAG (yttrium aluminum garnet) as the second and third ceramic elements 216, 217 without laser activator. Since different materials were used among the first to third ceramic elements 215, 216 and 217, the density distribution (refractive-index distribution) changed without any adjustment in sintering conditions.

A difference in refractive index between YGG (refractive index: 1.95) and YAG (refractive index: 1.82) causes a light confinement effect. Accordingly, the laser medium 110G may function as a waveguide, which results in more efficient conversion from the excitation light to the oscillating light.

As shown in section (b) of FIG. 21, since the first ceramic element has a cross section shape where ovals are connected, the center of the ovals is subject to tensile stress which is similar to the tensile stress described in the context of the second embodiment. Thus, the polarization ratio is increased.

The present inventors built the laser medium 110G described in the context of this embodiment into a solid laser light source and conducted an experiment about the polarization ratio. In this experiment, the present inventors confirmed oscillating light (fundamental light) having a polarization ratio of "100:1".

Fifth Embodiment

The wavelength conversion laser light source is described in the context of the fifth embodiment. The principles of applying the stress to the laser medium 110, 110C or 110D described in the context of the first and second embodiments are applicable to the wavelength conversion light source, which outputs oscillating light with the single polarization.

Figure 22:
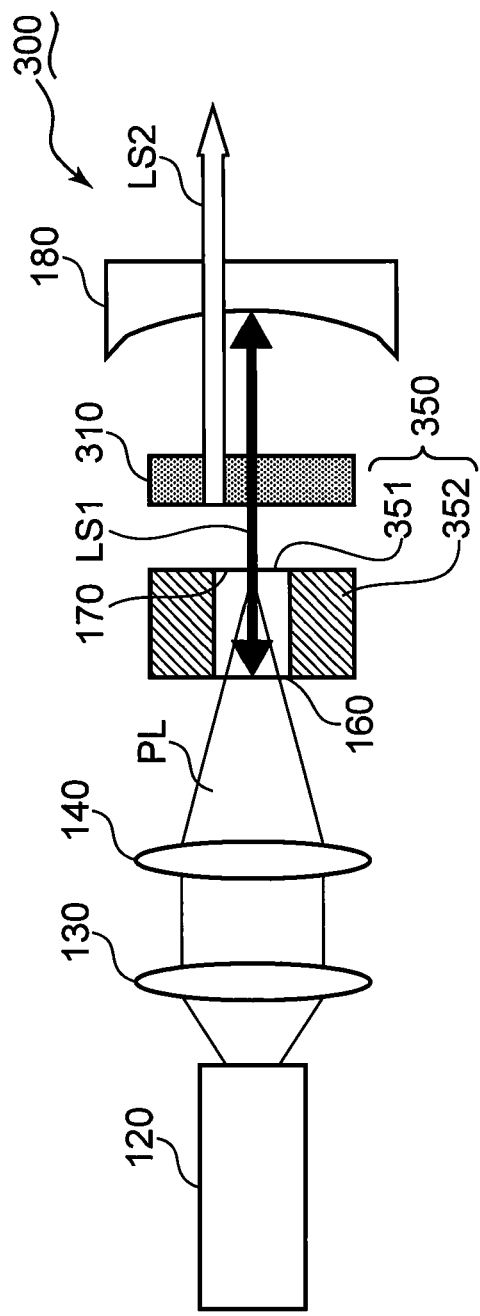
FIG. 22 is a schematic view of a wavelength conversion laser light source according to the fifth embodiment.

FIG. 22 is a schematic view of a wavelength conversion laser light source according to the fifth embodiment. The wavelength conversion laser light source according to the fifth embodiment is described with reference to FIGS. 3, 12, 14 and 22. The same elements as the elements described in the context of the first and/or second embodiments are given the same reference numerals. Descriptions relating to the first and/or second embodiments are incorporated by reference for the aforementioned elements.

Like the laser light source 100 described in the context of the first embodiment, the wavelength conversion laser light source 300 comprises an excitation light source 120, a collimator lens 130, a condenser lens 140 and an output mirror 180.

The wavelength conversion laser light source 300 further comprises a laser medium unit 350. The laser medium unit 350 includes a laser medium element 351 and a holder 352 which holds the laser medium element 351. The laser medium element 351 may be the laser medium 110 (refer to FIG. 3) described in the context of the first embodiment, the laser medium 110C (refer to FIG. 12) described in the context of the second embodiment, or a combination of the laser medium 110D and the resin 119 (refer to FIG. 14). The holder 352 may be the holder 190 or 190A described in the context of the first embodiment.

The excitation light source 120 emits excitation light PL. The collimator lens 130 shapes the excitation light PL into parallel light. The condenser lens 140 thereafter focuses the excitation light PL to the laser medium element 351.

The wavelength conversion laser light source 300 further comprises a 1060 nm band high reflection optical film 160 formed on an incident end surface of the laser medium element 351 to which the excitation light PL enters and a 1060 nm band high transmission optical film 170 formed on an exit end surface opposite to the incident end surface. Consequently, a resonator is formed to cause laser resonance between the high reflection optical film 160 and the output mirror 180. The laser resonance caused in the resonator generates laser beam LS1 with 1060 nm band.

The wavelength conversion laser light source 300 further comprises a wavelength converter 310 situated in the laser resonator. The wavelength converter 310 converts the wavelength of the laser beam LS1 to output a laser beam LS2 having a wavelength which is half the wavelength of the laser beam LS1. The laser beam LS2 is output to the outside through the output mirror 180.

Preferably, the laser beam LS1 having a polarization ratio of 100:1 or more is generated in response to the wavelength conversion operation. Thus, preferably, the laser medium 110C (third structure) described in the context of the second embodiment or the combination (fourth structure) of the laser medium 110D and the resin 119 is used as the laser medium element 351.

For example, if the laser medium 110C described in the context of the "third structure" is used as the laser medium element 351, the laser medium element 351 (laser medium 110C) thermally expands due to increases in output of the laser beam LS2 and the ambient environmental temperature. Consequently, great tensile stress is caused in the area of the laser medium element 351 through which the laser beam passes.

If the output of the laser beam LS2 is increased, the light is oscillated in an orthogonal direction to the polarization direction in the laser resonator after the wavelength conversion of the laser beam LS1 which has been subjected to the polarization direction control to make the laser beam LS1 polarized in an intended direction. Consequently, the polarization direction may be appropriately maintained even if the output is changed.

Figure 23:
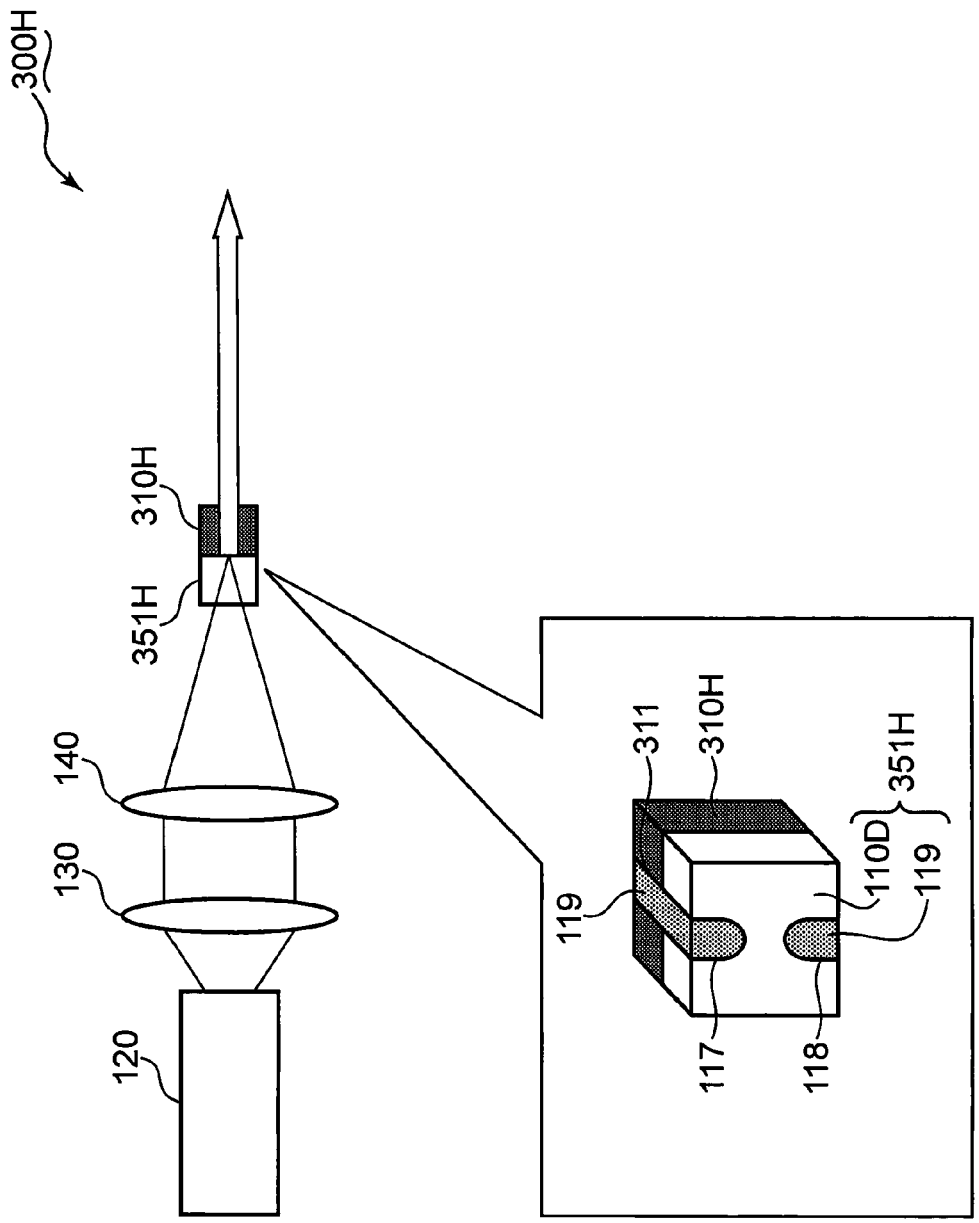
FIG. 23 is a schematic view of another configuration of the wavelength conversion laser light source according to the fifth embodiment.

FIG. 23 is a schematic view of another configuration of the wavelength conversion laser light source according to the fifth embodiment. The other wavelength conversion laser light source according to the fifth embodiment is described with reference to FIGS. 14, 22 and 23. The same elements as the elements described with reference to FIG. 22 are given the same reference numerals. Descriptions relating to FIG. 22 are incorporated by reference for the aforementioned elements.

Like the wavelength conversion laser light source 300 described with reference to FIG. 22, the wavelength conversion laser light source 300H shown in FIG. 23 also comprises an excitation light source 120, a collimator lens 130 and a condenser lens 140.

The wavelength conversion laser light source 300H comprises a laser medium element 351H and a wavelength converter 310H. The wavelength converter 310H is directly connected to the laser medium element 351H (microchip configuration). Consequently, the output mirror 180 of the wavelength conversion laser light source 300 described with reference to FIG. 22 becomes unnecessary. Therefore the wavelength conversion laser light source 300H may be downsized in comparison to the wavelength conversion laser light source 300 described with reference to FIG. 22.

Since the laser medium element 351H and the wavelength converter 310H are connected, it is more preferable to cause the stress in the laser medium 110D by the resin 119 (or other filler) according to the principles described in the context of the aforementioned "fourth structure" rather than causing the stress in the laser medium element 351H by the holder 352 described with reference to FIG. 22. Accordingly, the wavelength conversion laser light source 300H shown in FIG. 23 has a built-in combination of the resin 119 and the laser medium 110D as the laser medium element 351H. In this embodiment, the resin 119 is exemplified as the filler which is different in material from the laser medium element 351H and the wavelength converter 310H. Alternatively, another material to control the polarization direction according to the principles described in the context of the "fourth structure" may be used as the filler.

As described with reference to FIG. 14, the grooves 117, 118 are formed on the laser medium 110D. Grooves 311 in communication with the grooves 117, 118, respectively, are formed on the wavelength converter 310H. The resin 119 (for example, adhesive) is filled in the grooves 117, 118, 311 extending along the area, through which the laser beam passes, inside the laser medium 110D and the wavelength converter 310H. Consequently, the wavelength converter 310H is firmly fixed to the laser medium 110D, so that it becomes less likely that thermal stress causes separation between the laser medium 110D and the wavelength converter 310H. The resin 119 shrinks the grooves 117, 118, 311 according to the principles described in the context of the aforementioned "fourth structure".

The resin 119 causes stress in the wavelength converter 310H in addition to the laser medium 110D. Consequently, even if the wavelength conversion laser light source 300H is compact, it becomes likely that a high polarization ratio of 100:1 or more is maintained.

Without the groove 311 formed in the wavelength converter 310H, the polarization direction of the fundamental wave that contributes to the wavelength conversion is consumed. If the directly connected assembly of the laser medium 110D and the wavelength converter 310H is considered as a laser resonator for the fundamental wave, loss of the polarization direction of light which contributes to the wavelength conversion increases. Therefore it becomes likely that the fundamental wave oscillates in the other polarization directions.

In this embodiment, since the resin 119 causes stress in both the laser medium 110D and the wavelength converter 310H as described above, it becomes less likely the fundamental wave oscillates in the other polarization directions, which results in a stable output of green light.

In this embodiment, adhesive is filled in the grooves 117, 118, 311 as the resin 119. Alternatively, the resin 119 filled in the grooves 117, 118, 311 may be resin materials other than the adhesive. Further alternatively, a ceramic material may be used as the filler which is filled in the grooves 117, 118, 311.

If a dielectric material, in which a polarization-inverted structure is formed as the wavelength converter 310H, is used, a temperature, at which the filler filled in the grooves 117, 118, 311 cures, is preferably set to be at a Curie point or lower (preferably 500° C. or lower). Consequently, it becomes less likely that the polarization-inverted structure disappears.

Figure 24:
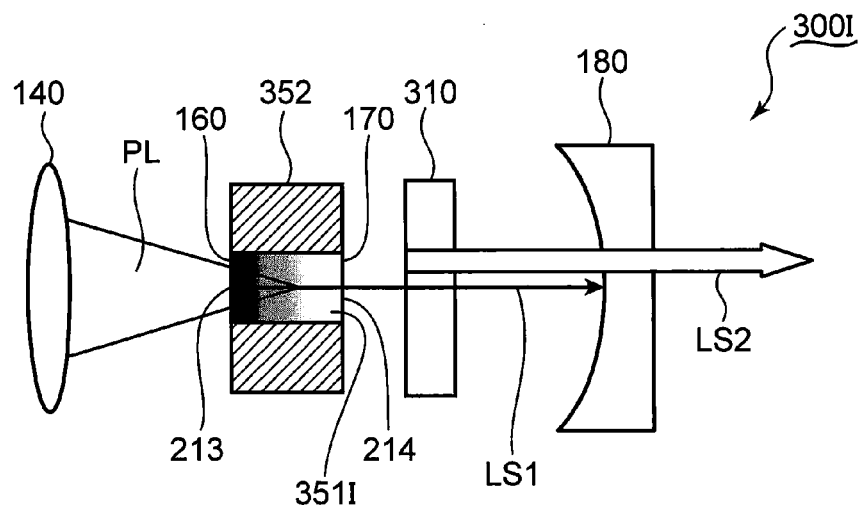
FIG. 24 is a schematic view of another configuration of the wavelength conversion laser light source according to the fifth embodiment.
Figure 25:
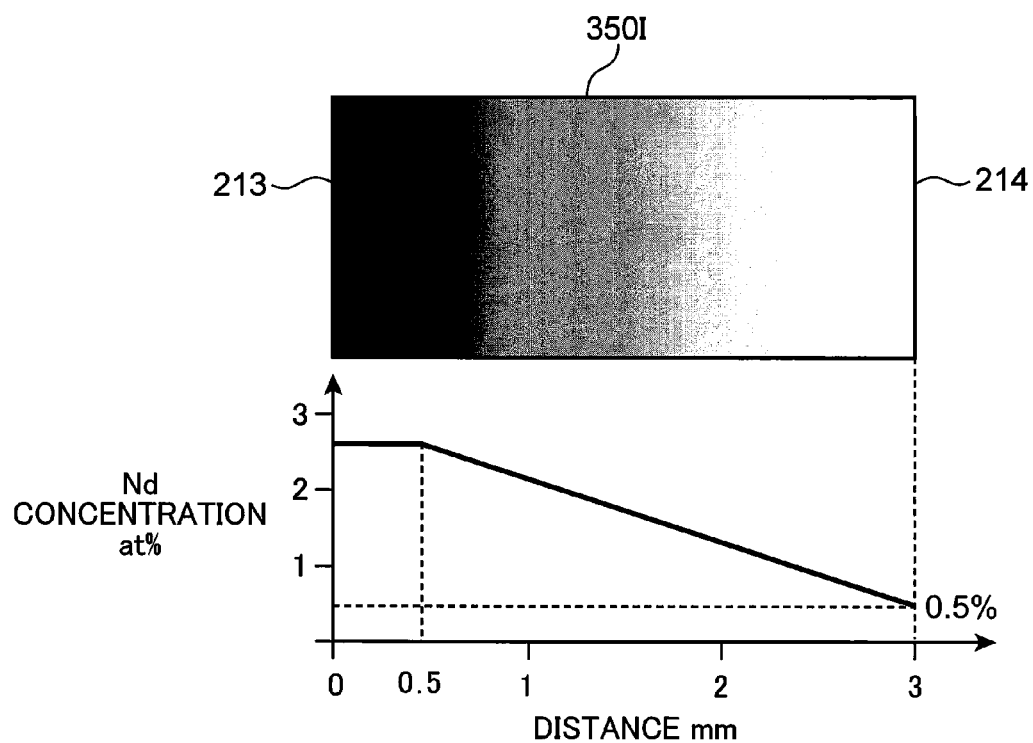
FIG. 25 is a concentration distribution diagram schematically showing a concentration change of the laser activator added to the laser medium shown in FIG. 24.

FIG. 24 is a schematic diagram of another configuration of the wavelength conversion laser light source according to the fifth embodiment. FIG. 25 schematically shows a change in concentration of the laser activator, which is added to the laser medium shown in FIG. 24. The other wavelength conversion laser light source according to the fifth embodiment is described with reference to FIGS. 3, 12, 14, 22, 24 and 25. The same elements as the elements described with reference to FIG. 22 are given the same reference numerals. Descriptions relating to FIG. 22 are incorporated by reference for the aforementioned elements.

Like the wavelength conversion laser light source 300 described with reference to FIG. 22, the wavelength conversion laser light source 300I shown in FIG. 24 comprises an excitation light source (not shown in FIG. 24), a collimator lens (not shown in FIG. 24), a condenser lens 140, an output mirror 180, a wavelength converter 310, a holder 352, a high reflection optical film 160 and a high transmission optical film 170.

The wavelength conversion laser light source 300I further comprises a laser medium element 351I held by the holder 352. The principles of the laser medium 110 (refer to FIG. 3) described in the context of the first embodiment, the laser medium 110C (refer to FIG. 12) described in the context of the second embodiment or a combination of the laser medium 110D and the resin 119 (refer to FIG. 14) may be applied to the laser medium element 351I.

A ceramic laser medium is used as the laser medium of the laser medium element 351I. Accordingly, the concentration of the laser activator (Nd in this embodiment) in the laser medium may be changed in an inclining manner (refer to FIG. 25). An operational temperature range of the wavelength conversion laser light source 300I may expand due to the concentration change of the laser activator.

For example, if a monocrystalline medium such as YAG or $YVO_4$ is used as the laser medium, the linear concentration change shown in FIG. 25 may not be obtained. In this embodiment, since a ceramic laser medium is used as the laser medium of the laser medium element 351I, the laser activator (Nd in this embodiment) in the laser medium is thermally diffused, which results in the linear concentration change in the laser medium. Consequently, the operational temperature range of the wavelength conversion laser light source 300I is appropriately expanded.

As shown in FIG. 25, a higher concentration of the laser activator (Nd in this embodiment) may be set near the incident end surface 213, to which the excitation light PL enters, than near the exit end surface 214 opposite to the incident end surface 213. The concentration of the laser activator may gradually decrease from the incident end surface 213 to the exit end surface 214.

Under a condition in which the ceramic laser medium having the concentration distribution of the laser activator shown in FIG. 25 is used, even if the oscillation wavelength of the excitation laser shifts due to a temperature so that the excitation light PL is not absorbed in an area of 0.5 mm from the incident end surface 213, the excitation light PL is appropriately absorbed in another area far by 0.5 mm or more from the incident end surface 213. Accordingly, it becomes likely that the absorbed amount of the excitation light PL in the ceramic laser medium is substantially consistent. Consequently, the operational range of the wavelength conversion laser light source 300I according to the present embodiment is 0° C. to 70° C. although the conventional wavelength conversion light source has an operational temperature range of approximately 20° C. to 40° C.

If the concentration of the laser activator in the overall ceramic laser medium is simply increased, the laser activator itself absorbs the oscillated light, which causes difficulties in appropriate laser oscillation. The concentration slope of the laser activator according to the principles of this embodiment may appropriately resolve the aforementioned problems.

The principles described in the context of the fifth embodiment may be suitably applied to a wavelength conversion laser light source. The wavelength conversion laser light source configured to generate green or blue visible light or ultraviolet light may be created on the basis of the principles described in the context of the fifth embodiment.

Sixth Embodiment

In this embodiment, an image display device with the wavelength conversion laser light source 300, 300H or 300I in the context of the aforementioned fifth embodiment is described.

Figure 26:
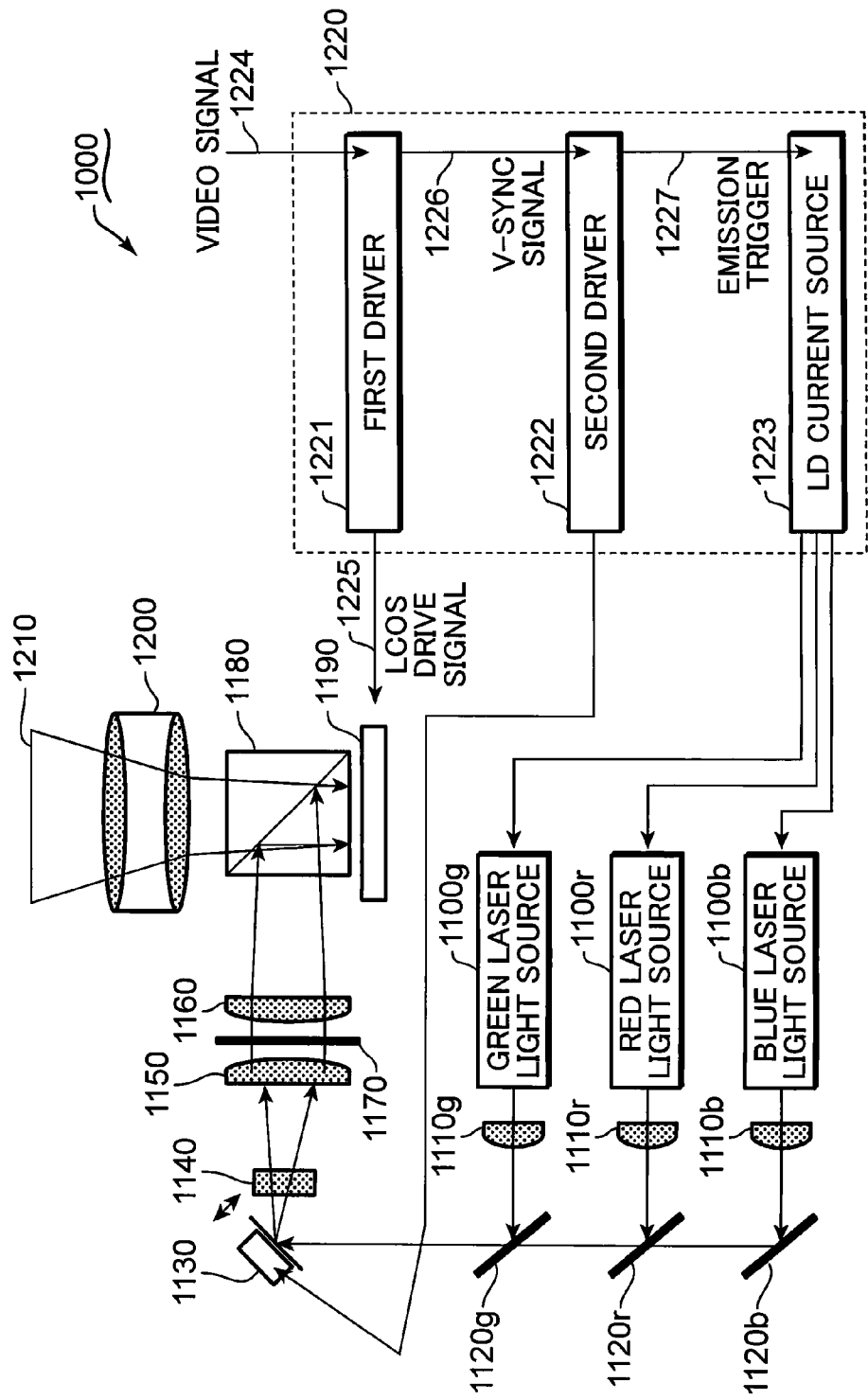
FIG. 26 is a schematic view of a laser projector according to the sixth embodiment.

FIG. 26 shows a laser projector (laser projector using ferroelectric LCOS as the two-dimensional modulator) which uses a laser as the light source. In this embodiment, the laser projector is exemplified as the image display device.

The laser projector 1000 comprises a blue laser light source 1100b, a red laser light source 1100r and a green laser light source 1100g. The laser projector 1000 further comprises collimator lenses 1110b, 1110r and 1110g corresponding to the blue, red and green laser light sources 1100b, 1100r and 1100g, respectively. The laser beams emitted from the blue, red and green laser light sources 1100b, 1100r and 1100g are collimated into parallel light by the collimator lenses 1110b, 1110r and 1110g, respectively. In this embodiment, the blue, red and/or green laser light sources 1100b, 1100r, 1100g may be the wavelength conversion laser light sources 300, 300H, 300I shown in the fifth embodiment. The blue, red and/or green laser light sources 1100b, 1100r, 1100g are exemplified as the laser light source configured to emit light.

The laser projector 1000 further comprises mirrors 1120b, 1120r and 1120g which reflect the laser beams, respectively, that have been collimated by the collimator lenses 1110b, 1110r and 1110g. The mirrors 1120b, 1120r and 1120g are dielectric multilayered mirrors having reflection characteristics in the blue (wavelength of 400 to 460 nm), red (wavelength of 600 nm or more) and green (wavelength of 520 to 560 nm) areas, respectively. The collimator lens 1110b, 1110r, 1110g and the mirrors 1120b, 1120r, 1120g are adjusted so that beam paths of the blue, red and green laser light source 1100b, 1100r and 1100g become coaxial immediately after the mirror 1120g.

The laser projector 1000 further comprises a scan mirror 1130 configured to scan the beams. In FIG. 26, the scan mirror 1130 scans the laser beams from the mirrors 1120b, 1120r and 1120g to refract rightward.

The laser projector 1000 further comprises a lens 1140 configured to shape the beams into a linear emission line. A cylindrical lens may be used as the lens 1140.

The laser projector 1000 further comprises lenses 1150, 1160, and a diffuser panel 1170 situated between the lenses 1150, 1160. The lenses 1150, 1160 are a pair of relay lens/field lens. The diffuser panel 1170 further shapes the beams into a band after the shaping process by the lens 1140 (cylindrical lens) into the emission line by the lens 1140 (cylindrical lens).

The laser projector 1000 further comprises a prism 1180 which is used as a polarization beam splitter, and a ferroelectric liquid crystal display device (LCOS 1190). ON/OFF operation of the LCOS 1190 is controlled by rotation of the polarization direction of the light. Accordingly, the prism 1180 functions as a polarization beam splitter. In this embodiment, the LCOS 1190 is exemplified as the modulator configured to modulate the light and form an image.

The beam is multiplexed before the scan mirror 1130. Subsequently, the beam scanned by the scan mirror 1130 enters the prism 1180 with the S-polarization. The reflective film in the prism 1180 is designed to reflect at the S-polarization. Accordingly, the light of the S-polarization illuminates the LCOS 1190. In this embodiment, the prism 1180 is exemplified as the reflective mirror.

The laser projector 1000 further comprises a projection lens 1200 and a screen 1210. The light reflected by the LCOS 1190 is projected on the screen 1210 through the projection lens 1200.

The laser projector 1000 comprises a controller 1220. The controller 1220 comprises a first driver 1221 configured to drive the LCOS 1190, a second driver 1222 configured to drive the laser light sources (blue, red and green laser light sources 1100b, 1100r and 1100g) and the scan mirror 1130. The controller 1220 also includes a laser current source 1223. In this embodiment, the second driver 1222 is exemplified as the laser driver.

The video signal 1224 is input to the first driver 1221. The first driver 1221 thereafter generates the LCOS drive signal 1225 to drive the LCOS 1190. The V-SYNC signal 1226 generated as one of the LCOS drive signals 1225 is output to the second driver 1222 as a trigger signal.

The second driver 1222 thereafter generates and outputs the emission trigger 1227 in response to the V-SYNC signal 1226. The emission trigger 1227 represents a drive waveform of the scan mirror 1130, and the emission timing of the laser light sources (blue, red and green laser light sources 1100b, 1100r and 1100g). The emission trigger 1227 is input to the laser current source 1223. The laser current source 1223 supplies the current to the laser light sources (blue, red and green laser light sources 1100b, 1100r and 1100g) in response to the emission trigger 1227.

An image is displayed on the screen 1210 through the sequential operation and control described above.

Seventh Embodiment

In this embodiment, an image display device using the wavelength conversion laser light sources 300, 300H or 300I in the context of the aforementioned fifth embodiment is described.

Figure 27:
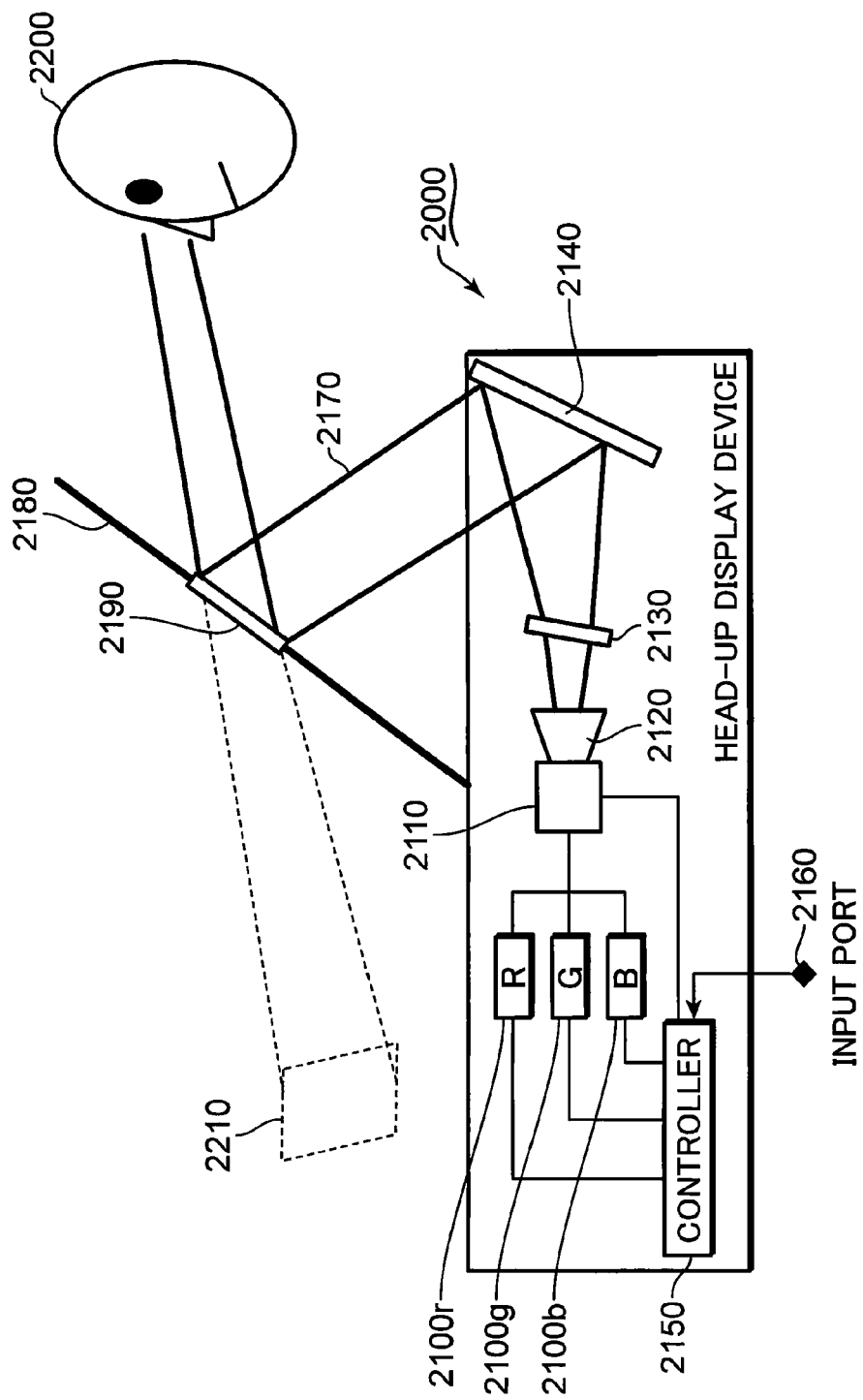
FIG. 27 is a schematic view of a head-up display device according to the seventh embodiment.

FIG. 27 schematically shows a head-up display device with a laser beam. In this embodiment, the head-up display device is exemplified as the image display device.

The head-up display device 2000 comprises a blue laser light source 2100b, a red laser light source 2100r and a green laser light source 2100g. The head-up display device 2000 further comprises a two-dimensional modulator 2110 such as a compact liquid crystal panel or a digital mirror device (DMD), a projection lens 2120, an intermediate screen 2130, a return mirror 2140, and a controller 2150 configured to control these elements.

The laser beams emitted from the blue, red and green laser light sources 2100b, 2100r and 2100g are multiplexed and shaped via an optical system (not shown), and thereafter illuminates the two-dimensional modulator 2110. The light modulated by the two-dimensional modulator 2110 is projected on the intermediate screen 2130 via the projection lens 2120, which results in an image on the intermediate screen 2130.

The head-up display device 2000 further comprises an input port 2160 to which image data is input. Data of images to be displayed by the head-up display device 2000 is input as electric signals from the input port 2160. The controller 2150 converts the signals of the image data into drive signals of the two-dimensional modulator 2110. The controller 2150 generates timing signals to define illumination timings of the blue, red and green laser light sources 2100*b*, 2100*r* and 2100*g* in response to the signals of the image data.

The controller 2150 supplies the required current to the blue, red and green laser light sources 2100*b*, 2100*r* and 2100*g* in conjunction with the timing signals, which results in the illumination from the blue, red and green laser light sources 2100*b*, 2100*r* and 2100*g*.

As described above, the display light 2170, which represents the images depicted on the intermediate screen 2130, is reflected by the return mirror 2140 toward the reflective mirror 2190 mounted on the vehicle's windshield 2180. The reflective mirror 2190 further reflects the display light 2170 toward the driver 2200.

It is thereby possible to view the virtual image 2210 (area shown with the dotted line in FIG. 27) of the image represented by the display light 2170 through the windshield 2180.

The head-up display device 2000 may provide images to the driver 2200 through the sequential operation and control described above.

In the image display device described in the context of the sixth and seventh embodiments, for example, the principles of the wavelength conversion laser light sources 300, 300H, 300I described in the context of the aforementioned fifth embodiment may be applied to the green laser light sources 1100*g*, 2100*g*.

The aforementioned embodiments mainly comprise the following configurations.

The laser light source according to one aspect of the aforementioned embodiments comprises a semiconductor laser light source configured to emit a laser beam; a laser medium excited by the semiconductor laser light source to emit light; two reflectors configured to work as a resonator to confine the light emitted by the laser medium; and a holder configured to hold the laser medium, wherein stress is generated in the laser medium formed of a ceramic material situated in the resonator so as to control a polarization direction of the light emitted by the laser medium.

According to the aforementioned configuration, the semiconductor laser light source emits the laser beam. The laser medium is excited by the semiconductor laser light source to emit light. The two reflectors work as a resonator to confine the light emitted by the laser medium. The holder holds the laser medium. Since the stress is generated in the laser medium formed with a ceramic material situated in the resonator so as to control the polarization direction of the light emitted by the laser medium, the laser light source becomes a compact and inexpensive.

In the aforementioned configuration, preferably, the holder includes a stress generation structure configured to generate the stress, and the stress generation structure generates tensile stress in an area along an optical path of the light emitted by the laser medium.

According to the aforementioned configuration, the holder includes the stress generation structure configured to generate the stress in the laser medium. The stress generation structure generates the tensile stress in the area along the optical path of the light emitted by the laser medium. Accordingly, the polarization of the light is controlled to direct in the direction of the tensile stress.

In the aforementioned configuration, preferably, the laser medium includes a stress generation structure configured to generate the stress, and the stress generation structure generates tensile stress in an area along an optical path of the light emitted by the laser medium.

According to the aforementioned configuration, the laser medium includes a stress generation structure configured to generate the stress. The stress generation structure generates the tensile stress in the area along the optical path of the light emitted by the laser medium. Accordingly, the polarization of the light is controlled to direct in the direction of the tensile stress.

In the aforementioned configuration, preferably, an optical path of the laser beam in the laser medium is inclined with respect to an optical path of the light emitted by the laser medium to cause thermal strain in an area along the optical path of the light emitted by the laser medium.

According to the aforementioned configuration, as a result of the inclination of the optical path of laser beam in the laser medium with respect to the optical path of the light emitted by the laser medium, the thermal strain is generated in the area along the optical path of the light emitted by the laser medium. Therefore, the laser light source becomes a compact and inexpensive.

In the aforementioned configuration, preferably, the stress generation structure includes a groove formed in the laser medium, and the groove extending along the optical path of the light emitted by the laser medium is shrunk to cause the tensile stress.

According to the aforementioned configuration, the stress generation structure includes the groove formed in the laser medium. The tensile stress which controls the polarization direction of the light emitted by the laser beam is generated as a result of the shrinkage of the groove extending along the optical path of the light emitted by the laser medium. Therefore, the laser light source becomes a compact and inexpensive.

In the aforementioned configuration, preferably, the stress generation structure includes filler different in material from the laser medium, and the filler filled in the groove shrinks the groove.

According to the aforementioned configuration, the stress generation structure includes filler different in material from the laser medium. Since the filler filled in the groove shrinks the groove, the tensile stress is generated to control the polarization direction of the light emitted by the laser medium. Therefore, the laser light source becomes a compact and inexpensive.

In the aforementioned configuration, preferably, the filler includes a resin material.

According to the aforementioned configuration, since the resin material filled in the groove shrinks the groove, the tensile stress is generated to control the polarization direction of the light emitted by the laser medium. Therefore, the laser light source becomes a compact and inexpensive.

In the aforementioned configuration, preferably, the filler includes a ceramic material.

According to the aforementioned configuration, since the ceramic material filled in the groove shrinks the groove, the tensile stress is generated to control the polarization direction of the light emitted by the laser medium. Therefore, the laser light source becomes a compact and inexpensive.

In the aforementioned configuration, preferably, the laser medium includes a first area in which the optical path of the light emitted by the laser medium is defined, and a second area and a third area which are adjacent to the first area, and the holder applies compressive force to the second and third areas to cause the tensile stress in the first area.

According to the aforementioned configuration, the laser medium includes the first area in which the optical path of the light emitted by the laser medium is defined, and the second and third areas adjacent to the first area. As a result of the holder applying the compressive force to the second and third areas, the tensile stress is caused in the first area to control the polarization direction of the light emitted by the laser medium. Therefore, the laser light source becomes a compact and inexpensive.

In the aforementioned configuration, preferably, the semiconductor laser light source is situated so that the optical path of the laser beam is inclined with respect to the optical path of the light emitted by the laser medium.

According to the aforementioned configuration, as a result of the semiconductor laser light source situated so that the optical path of the laser beam is inclined with respect to the optical path of the light emitted by the laser medium, thermal strain is generated in the area along the optical path of the light emitted by the laser medium. The thermal strain generates the stress, which controls the polarization of the light emitted by the laser medium to be directed in the inclination direction of the optical path of the laser beam with respect to the optical path of the light emitted by the laser medium. Therefore, the laser light source becomes a compact and inexpensive.

In the aforementioned configuration, preferably, the laser medium includes an incident end surface to which the laser beam enters, and the incident end surface is inclined with respect to a plane perpendicular to the optical path of the light emitted by the laser medium.

According to the aforementioned configuration, the laser medium includes an incident end surface to which the laser beam enters. Since the incident end surface is inclined with respect to the plane perpendicular to the optical path of the light emitted by the laser medium, the thermal strain is generated in the area along the optical path of the light emitted by the laser medium. The thermal strain generates stress which controls the polarization of the light emitted by the laser medium to be directed in the inclination direction of the optical path of the laser beam with respect to the optical path of the light emitted by the laser medium. Therefore, the laser light source becomes a compact and inexpensive.

The wavelength conversion laser light source according to another aspect of the aforementioned embodiments comprises a semiconductor laser light configured to emit a laser beam; a laser medium excited by the semiconductor laser light source to emit light; a wavelength converter configured to convert a wavelength of the light emitted by laser medium; two reflectors configured to work as a resonator to confine the light emitted by the laser medium; and a holder configured to hold the laser medium, wherein stress is generated in the laser medium formed of a ceramic material situated in the resonator so as to control a polarization direction of the light emitted by the laser medium.

According to the aforementioned configuration, the semiconductor laser light source emits a laser beam. The laser medium is excited by the semiconductor laser light source to emit light. The wavelength converter converts the wavelength of the light emitted by the laser medium. The two reflectors work as a resonator to confine the light emitted by the laser medium. The holder holds the laser medium. Since the stress is generated in the laser medium formed of a ceramic material situated in the resonator so as to control the polarization direction of the light emitted by the laser medium, the laser light source becomes a compact and inexpensive.

The wavelength conversion laser light source according to another aspect of the aforementioned embodiments comprises a semiconductor laser light source configured to emit a laser beam; a laser medium excited by the semiconductor laser light source to emit light; a wavelength converter configured to convert a wavelength of the light emitted by laser medium; and two reflectors configured to work as a resonator to confine the light emitted by the laser medium, wherein the wavelength converter optically coupled to the laser medium is situated in the resonator, and stress is generated in the laser medium formed of a ceramic material situated in the resonator so as to control a polarization direction of the light emitted by the laser medium.

According to the aforementioned configuration, the semiconductor laser light source emits a laser beam. The laser medium is excited by the semiconductor laser light source to emit light. The wavelength converter converts the wavelength of the light emitted by the laser medium. The two reflectors work as a resonator to confine the light emitted by the laser medium. The wavelength converter optically coupled to the laser medium is situated in the resonator. Since the stress is generated in the laser medium formed of a ceramic material situated in the resonator so as to control the polarization direction of the light emitted by the laser medium, the laser light source becomes a compact and inexpensive.

In the aforementioned configuration, preferably, the wavelength conversion laser light source further comprises filler different in material from the laser medium and the wavelength converter, wherein a groove along an optical path of the light emitted by the laser medium is formed in the laser medium and the wavelength converter, and the filler filled in the groove shrinks the groove to cause tensile stress in an area along the optical path of the light emitted by the laser medium.

According to the aforementioned configuration, the wavelength conversion laser light source further comprises filler different in material from the laser medium and the wavelength converter. The groove along the optical path of the light emitted by the laser medium is formed in the laser medium and the wavelength converter. The filler filled in the groove shrinks the groove to generate the tensile stress in the area along the optical path of the light emitted by the laser medium. Since the tensile stress controls the polarization direction of the light emitted by the laser medium, the laser light source becomes a compact and inexpensive.

In the aforementioned configuration, preferably, the laser medium includes an incident end surface to which the laser beam enters, and an exit end surface opposite to the incident end surface, laser activator is added to the laser medium, and concentration of the laser activator decreases from the incident end surface toward the exit end surface.

According to the aforementioned configuration, the laser medium includes the incident end surface to which the laser beam enters, and the exit end surface opposite to the incident end surface. The laser activator is added to the laser medium. Since the concentration of the laser activator decreases from the incident end surface toward the exit end surface, an amount of the laser beam to be absorbed by the laser medium becomes stabilized.

The image display device according to another aspect of the aforementioned embodiments comprises a laser light source configured to emit light; a laser driver configured to supply current to the laser light source; a modulator configured to modulate the light to form an image; a reflective mirror configured to reflect light output from the modulator; and a controller configured to drive the modulator, wherein the laser light source includes the aforementioned wavelength conversion laser light source.

According to the aforementioned configuration, the laser light source emits light once the laser driver supplies current. The image modulator modulates the light from the laser light source. The reflective mirror reflects the light output from the modulator. The controller drives the image modulator to control the image displayed by the image display device. Since the laser light source includes the aforementioned wavelength conversion laser light source, high output may be maintained for a long period of time.

INDUSTRIAL APPLICABILITY

A compact laser light source device is provided according to the principles of the aforementioned embodiments. The polarization direction is appropriately controlled since the holder configured to hold the ceramic laser medium of the laser light source device or the ceramic laser medium itself is structured to control the polarization direction.

The invention claimed is:

1. A laser light source, comprising:
   a semiconductor laser light source operable for emitting a laser beam;
   a laser medium excited by the semiconductor laser light source to emit light;
   two reflectors operable for working as a resonator to confine the light emitted by the laser medium; and
   a holder operable for holding the laser medium,
   wherein the laser medium is formed of a ceramic material situated in the resonator,
   wherein the holder includes a stress generation structure operable for (i) generating tensile stress in an area of the laser medium along an optical path of the light emitted by the laser medium and (ii) controlling a polarization direction of the light emitted by the laser medium.

2. The laser light source according to claim 1,
   wherein the laser medium includes (i) a first area in which the optical path of the light emitted by the laser medium is defined, (ii) a second area, and (ii) a third area, the second area and the third area being adjacent to the first area, and
   wherein the holder applies compressive force to the second area and the third area to cause the tensile stress in the first area.

3. A laser light source, comprising:
   a semiconductor laser light source operable for emitting a laser beam;
   a laser medium excited by the semiconductor laser light source to emit light;
   two reflectors operable for working as a resonator to confine the light emitted by the laser medium; and
   a holder operable for holding the laser medium,
   wherein the laser medium is formed of a ceramic material situated in the resonator,
   wherein the laser medium includes a stress generation structure operable for (i) generating tensile stress in an area of the laser medium along an optical path of the light emitted by the laser medium and (ii) controlling a polarization direction of the light emitted by the laser medium.

4. The laser light source according to claim 3,
   wherein the stress generation structure includes a groove formed in the laser medium, and
   wherein the groove extends along the optical path of the light emitted by the laser medium, and the groove is shrunk to cause the tensile stress.

5. The laser light source according to claim 4,
   wherein the stress generation structure includes filler different in material from the laser medium, and
   wherein the filler fills in the groove and shrinks the groove.

6. The laser light source according to claim 5, wherein the filler includes a resin material.

7. The laser light source according to claim 5, wherein the filler includes a ceramic material.

8. A laser light source, comprising:
   a semiconductor laser light source operable for emitting a laser beam;
   a laser medium excited by the semiconductor laser light source to emit light;
   two reflectors operable for working as a resonator to confine the light emitted by the laser medium; and
   a holder operable for holding the laser medium,
   wherein the laser medium is formed of a ceramic material situated in the resonator,
   wherein the semiconductor laser light source is displaced from the optical path of the light emitted from the laser medium to (i) make an optical path of the laser beam inclined from an optical path of the light emitted by the laser medium in a plane coincident to a polarization direction of the light emitted by the laser medium and (ii) cause thermal strain in an area along the optical path of the light emitted by the laser medium, and
   wherein the thermal strain causes stress in the laser medium to control a polarization direction of the light emitted by the laser medium.

9. A wavelength conversion laser light source, comprising:
   a semiconductor laser light operable for emitting a laser beam;
   a laser medium excited by the semiconductor laser light source to emit light;
   a wavelength converter operable for converting a wavelength of the light emitted by laser medium;
   two reflectors operable for working as a resonator to confine the light emitted by the laser medium;
   a holder operable for holding the laser medium; and
   filler different in material from the laser medium and the wavelength converter,
   wherein the laser medium is formed of a ceramic material situated in the resonator,
   wherein a groove along an optical path of the light emitted by the laser medium is formed in the laser medium and the wavelength converter, and
   wherein the filler fills in the groove and shrinks the groove to (i) cause tensile stress in an area of the laser medium along the optical path of the light emitted by the laser medium and (ii) control a polarization direction of the light emitted by the laser medium.

10. The wavelength conversion laser light source according to claim 9,
    wherein the laser medium includes an incident end surface to which the laser beam enters, and an exit end surface opposite to the incident end surface,
    wherein laser activator is added to the laser medium, and
    wherein concentration of the laser activator decreases from the incident end surface toward the exit end surface.

11. An image display device, comprising:
    a laser light source operable for emitting light;
    a laser driver operable for supplying current to the laser light source;
    a modulator operable for modulating the light to form an image;
    a reflective mirror operable for reflecting light output from the modulator; and
    a controller operable for driving the modulator,
    wherein the laser light source includes the wavelength conversion laser light source according to claim 9.

12. A wavelength conversion laser light source, comprising:

a semiconductor laser light source operable for emitting a laser beam;

a laser medium excited by the semiconductor laser light source to emit light;

a wavelength converter operable for converting a wavelength of the light emitted by laser medium;

two reflectors operable for working as a resonator to confine the light emitted by the laser medium; and filler different in material from the laser medium and the wavelength converter wherein the wavelength converter optically coupled to the laser medium is situated in the resonator, wherein the laser medium is formed of a ceramic material situated in the resonator, wherein a groove along an optical path of the light emitted by the laser medium is formed in the laser medium and the wavelength converter, and wherein the filler fills in the groove and shrinks the groove to (i) cause tensile stress in an area of the laser medium along the optical path of the light emitted by the laser medium and (ii) control a polarization direction of the light emitted by the laser medium.

* * * * *